(12) United States Patent
Makiyama

(10) Patent No.: US 10,110,516 B2
(45) Date of Patent: Oct. 23, 2018

(54) COMPUTER-READABLE RECORDING MEDIUM, SWITCH CONTROLLING APPARATUS, AND METHOD OF CONTROLLING A SWITCH

(71) Applicant: FUJITSU LIMITED, Kawasaki-shi, Kanagawa (JP)

(72) Inventor: Yasushi Makiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 15/285,538

(22) Filed: Oct. 5, 2016

(65) Prior Publication Data

US 2017/0149693 A1     May 25, 2017

(30) Foreign Application Priority Data

Nov. 25, 2015    (JP) ................................. 2015-229753

(51) Int. Cl.
*G01R 31/08*     (2006.01)
*H04L 12/935*     (2013.01)
*H04L 12/933*     (2013.01)
*H04L 12/939*     (2013.01)
*H04L 12/931*     (2013.01)

(52) U.S. Cl.
CPC .............. *H04L 49/30* (2013.01); *H04L 49/15* (2013.01); *H04L 49/55* (2013.01); *H04L 49/65* (2013.01)

(58) Field of Classification Search
USPC ....... 370/390, 219, 222, 236, 241, 244, 250, 370/252, 254, 321, 352, 384, 395.53, 405, 370/433, 449, 469, 522
See application file for complete search history.

(56) References Cited

FOREIGN PATENT DOCUMENTS

| JP | 05-199244 | 8/1993 |
|---|---|---|
| JP | 2008-135897 | 6/2008 |
| JP | 2011-071774 | 4/2011 |

*Primary Examiner* — Phuongchau Ba Nguyen
(74) *Attorney, Agent, or Firm* — Fujitsu Patent Center

(57) ABSTRACT

A non-transitory computer readable recording medium having stored therein a switch controlling program causing a computer to execute a process includes acquiring port information on a switch that comprises a plurality of first and second ports, where the port information including connection destinations of the second ports and being acquired for each of the second ports before swapping the switch for another switch; instructing to close the first ports of the another switch after the switch is swapped; acquiring the port information on the another switch for each of the second ports after the swapping; determining whether there exists the second port whose connection destination is unchanged before and after the swapping; and instructing to open the first port of the another switch, where data being transferred between the opened first port and the second port whose connection destination is unchanged before and after the swapping.

10 Claims, 25 Drawing Sheets

FIG.8

| switch number | port number of uplink port | link state | connection destination |
|---|---|---|---|
| #1 | 9 | link-up | external switch #1, port 1 |
| | 10 | link-up | external switch #2, port 1 |
| | 11 | link-up | external switch #3, port 1 |
| | 12 | link-up | external switch #4, port 1 |

| switch number | Model |
|---|---|
| #1 | Model-A |

| link state of uplink port 52 before swapping | link state of uplink port 52 after swapping | comparison result of connection destinations | determination result of connection state | pattern |
|---|---|---|---|---|
| link-down | link-down | no information after swapping | correctly connected | B |
| link-down | link-up | coincide | correctly connected | A |
| link-down | link-up | dos not coincide | wiring error | C |
| link-up | link-down | no information after swapping | unconnected | D |
| link-up | link-up | coincide | correctly connected | A |
| link-up | link-up | dos not coincide | wiring error | C |

FIG.17 first time around (initial state)

| switch number | port number of uplink port 52 | link state | connection destination |
|---|---|---|---|
| #1 | 9 | link-down | none |
| | 10 | link-down | none |
| | 11 | link-down | none |
| | 12 | link-down | none |

} 59

second time around (cable is connected to the port #9 and port #10)

| switch number | port number of uplink port 52 | link state | connection destination |
|---|---|---|---|
| #1 | 9 | link-up | external switch #1, port 1 |
| | 10 | link-down | external switch #2, port 1 |
| | 11 | link-down | none |
| | 12 | link-down | none |

} 59

third time around (cable is connected to all of the ports)

| switch number | port number of uplink port 52 | link state | connection destination |
|---|---|---|---|
| #1 | 9 | link-up | external switch #1, port 1 |
| | 10 | link-up | external switch #2, port 1 |
| | 11 | link-up | external switch #3, port 1 |
| | 12 | link-up | external switch #4, port 1 |

} 59

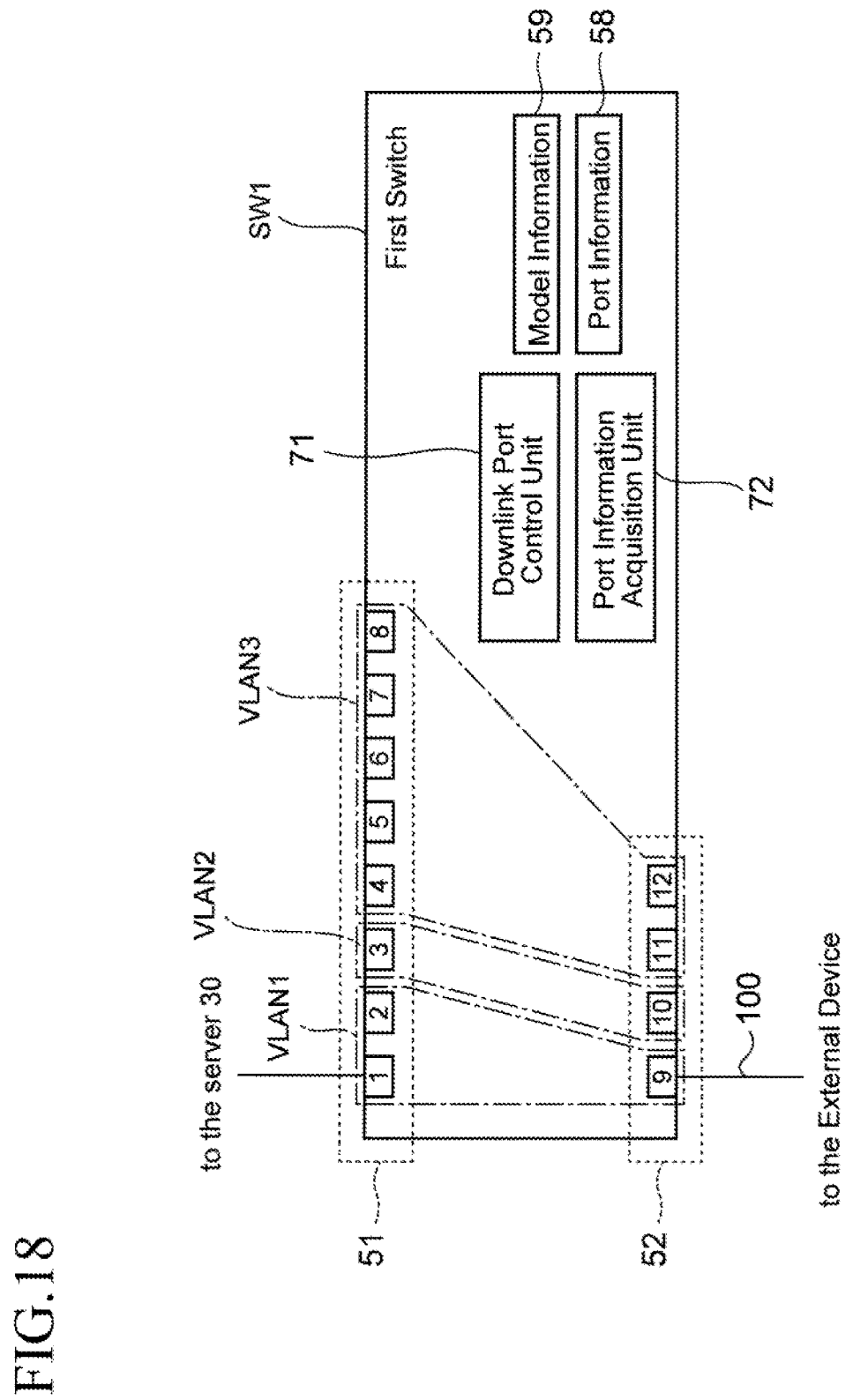

COMPUTER-READABLE RECORDING MEDIUM, SWITCH CONTROLLING APPARATUS, AND METHOD OF CONTROLLING A SWITCH

CROSS-REFERENCE TO RELATED APPLICATION(S)

This application is based upon and claims the benefit of priority of the prior Japanese Patent Application No. 2015-229753, filed on Nov. 25, 2015, the entire contents of which are incorporated herein by reference.

FIELD

The embodiments discussed herein are related to a switch controlling program, switch controlling apparatus, and method of controlling a switch.

BACKGROUND

Along with the development in information processing technology, servers and switches are densely installed in a data center, and hence cables for connecting the servers and the switches tend to be congested accordingly.

The congestion of cables makes it difficult for an operator to visually check the cables one by one. As a consequence, the operator may cause a wiring error by connecting the cables to wrong connection destinations. Then, a system itself will be shut down, when the servers and the switches are put into operation without awareness of the existence of the wiring error.

Note that techniques related to this application are disclosed in Japanese Laid-open Patent Publications No. 05-199244, No. 2008-135897, and No. 2011-71774.

SUMMARY

According to one aspect discussed herein, there is provided a non-transitory computer readable recording medium having stored therein a switch controlling program causing a computer to execute a process including: acquiring port information on a switch that comprises a plurality of first ports and a plurality of second ports, where data being transferred between the first ports and the second ports, and the port information including connection destinations of the second ports and being acquired for each of the second ports before swapping the switch for another switch; instructing to close each of the first ports of the another switch after the switch is swapped for the another switch; acquiring the port information on the another switch for each of the second ports after the swapping; determining whether there exists the second port whose connection destination is unchanged before and after the swapping, by comparing the port information of the another switch after the swapping and the port information of the switch before the swapping for each of the second ports; and instructing to open at least the first port of the another switch, where data being transferred between the opened first port and the second port whose connection destination is unchanged before and after the swapping, when it is determined, by the determining, that there exists the second port whose connection destination is unchanged before and after the swapping.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 8 is a diagram illustrating an example of port information according to the first embodiment;

FIG. 9 is a diagram illustrating an example of model information held in the switch according to the first embodiment;

FIG. 15 is a schematic diagram illustrating determination rules in determination processing according to the first embodiment;

FIG. 17 includes diagrams schematically illustrating an example of changes in contents of the port information in the first embodiment;

FIG. 18 is a functional configuration diagram of a first switch according to a second embodiment.

DESCRIPTION OF EMBODIMENTS

Prior to describing the embodiments, matters investigated by the inventor of the present application will be explained.

In a data center, switches and other devices are connected to one another via a plurality of cables. Here, when the switch breaks down, the cables are disconnected from the switch, and then the swapping work is performed for the switch.

Figure 1:
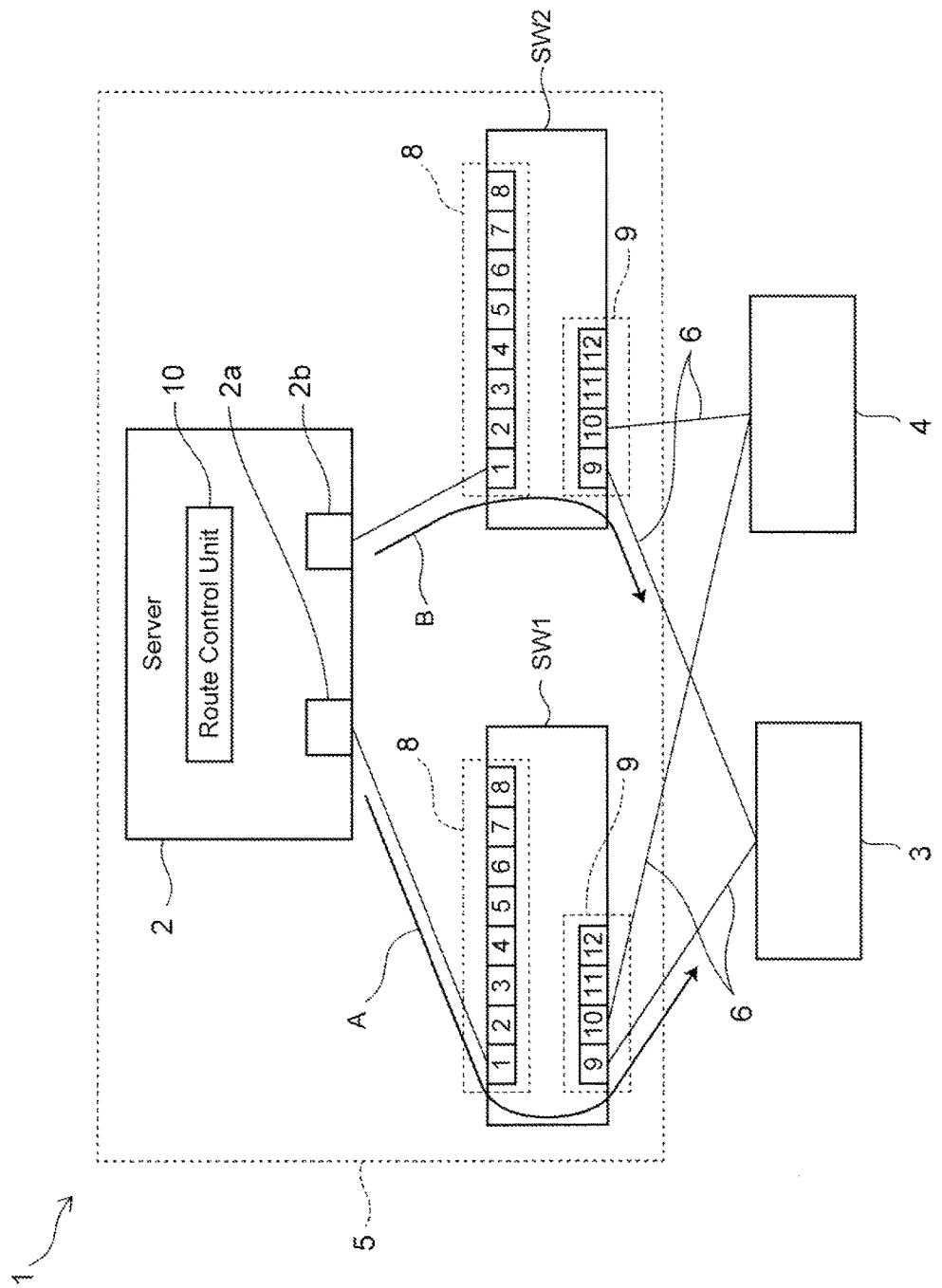
FIG. 1 is a network configuration diagram of a system including a switch to be swapped.

FIG. 1 is a network configuration diagram of a system including a switch to be swapped.

This system 1 includes a server 2, a first switch SW1, a second switch SW2, a first external device 3, and a second external device 4.

Among them, the server 2 and the first and second switches SW1 and SW2 are housed in a chassis 5 of a server rack in an insertable and removable manner. Such insertable and removable server and switches are referred to as a blade server and blade switches, respectively.

Moreover, the server 2 is connected to the first and second switch SW1 and SW2 via a LAN (local area network). The server 2 include a first LAN controller 2a and a second LAN controller 2b which are functioned as interface to the LAN.

The first and second switches SW1 and SW2 are L2 (layer 2) switches, which transfer data between the server 2 and the external devices 3 and 4.

In this example, the first switch SW1 and the second switch SW2 having the same configuration are provided in order to make a network redundant. Then, the first switch SW1 is used as an active system while the second switch SW2 is used as a standby system.

Each of the first switch SW1 and the second switch SW2 includes a plurality of downlink ports 8 and a plurality of uplink ports 9.

The downlink ports 8 are LAN ports connected to the server 2. In this example, the first and second switches SW1 and SW2 are connected by un unillustrated wiring boards in the chassis 5, thereby connecting the downlink ports 8 to the server 2, Therefore, no cables are needed for connecting the downlink ports 8 to the server 2.

On the other hand, the uplink ports 9 are LAN ports connected to the first external device 3 and the second external device 4.

The first external device 3 and the second external device 4 are a switch or a server for example, which is connected to the first and second switches SW1 and SW2 via LAN cables 6.

In the above-described system 1, when the switch SW1 of the active system is in normal operation, data are transferred between the server 2 and the first external device 3 along a route A which passes through the first switch SW1.

Meanwhile, when the first switch SW1 of the active system breaks down, route is switched to a rout B which passes through the second switch SW2 of the standby system.

A route control program for automatically switching the route in this manner is installed in the server 2, and a route control unit 10 is activated by execution of that program.

The route control unit 10 monitors whether or not a link is established between each of the downlink ports 8 of the first switch SW1 and the server 2. When there exists downlink ports 8 which fails to establish the link, the route control unit automatically switches the route A, which passes through the port whose link is not established, to the route B.

Then, the data is transferred using the route B until the broken first switch SW1 is swapped.

In order to swap the first switch SW1, the plurality of cables 6 are disconnected from the uplink ports 9 of the broken first switch SW1, and then the first switch SW1 is removed from the chassis 5. Thereafter, a new first switch SW1 is inserted into the chassis 5, and then the cables 6 are connected to new uplink ports 9 thereof in the same manner as before the swapping.

When the first switch SW1 is swapped in this manner, a link is established between each downlink port 8 of the swapped first switch SW1 and the server 2. When the route control unit 10 detects such a link establishment, the route control unit 10 switches the data transfer route from the route B to the route A.

However, a wiring error may be caused by carelessness of an operator who connects the cables 6 to different uplink ports 9 from those before the swapping at the time of swapping the first switch SW1. Moreover, the cables 6 may remain unconnected due to a failure of the operator who does not fully insert the cables 6 into the uplink ports 9.

These mistakes are likely to occur particularly when the servers 2 and the first switches SW1 are densely installed and hence the plurality of cables 6 are congested.

When there exists connection error such as wiring error and unconnected cable, the server 2 cannot be connected to the first external device 3 via the first switch SW1, whereby the system 1 becomes unusable. Accordingly, in this case, the route control unit 10 detects that it is not possible to connect to the first external device 3, and the data transfer route is switched again from the route A to the route B by the route control unit 10. In this case, however, the system 1 becomes temporarily unusable in the course of the switching from the route A to the route B, and hence the availability of the system 1 reduces.

To deal with this problem, it is also considered that when the first switch SW1 breaks down and thus the route B is selected, the route B is continuously used even after the first switch SW1 is swapped, and the data transfer route is brought back to the route A when the second switch SW2 breaks down later.

In this case, however, the existence of the wiring error in the swapped first switch SW1 cannot be discovered until the route is brought back to the route A due to the breakdown of the second switch SW2. Moreover, since the second switch SW2 is also broken at this time, neither the first switch SW1 nor the second switch SW2 is usable when the wiring error exists in the first switch SW1 after swapping. As a consequence, the entire system 1 will become unusable.

This problem may possibly be solved by causing the route control unit 10 somehow to detect the existence of a wiring error or unconnected cable in the cables 6.

However, though the route control unit 10 can confirm whether or not the link is established between the downlink port 8 and the server 2, the route control unit 10 cannot confirm whether or not the link is established between the uplink port 9 and the first external device 3. Accordingly, it is not possible to detect the existence of the wiring error and the unconnected cable on the uplink port 9 side by using the route control unit 10.

In the meantime, still another option is to cause the route control unit 10 to monitor a connection state of the cable 6 by using link-state tracking function of the first switch SW1.

Figure 2:
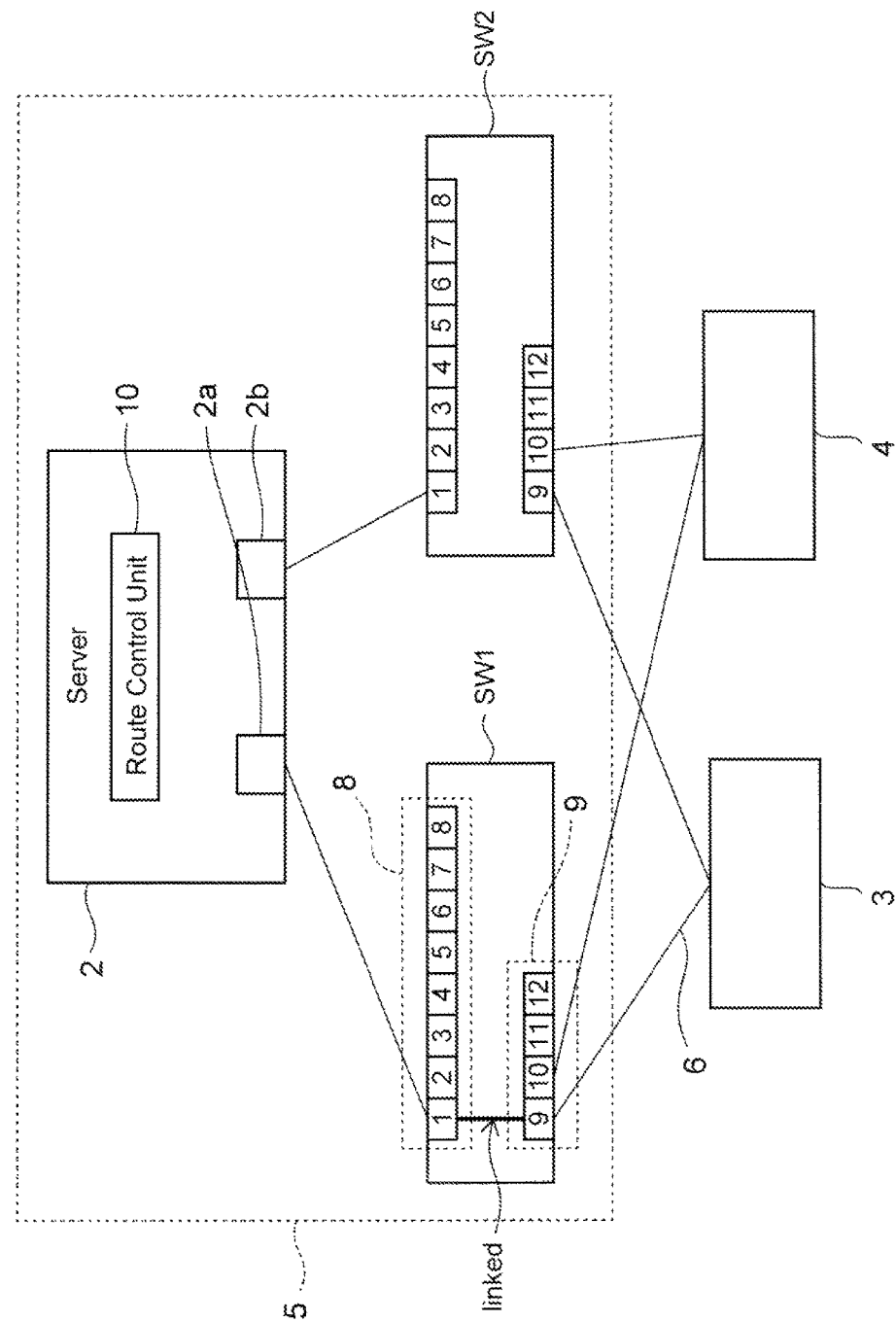
FIG. 2 is a schematic diagram for explaining link-state tracking.

FIG. 2 is a schematic diagram for explaining the link-state tracking function.

The link-state tracking function is a function performed by the first switch SW1 itself to forcibly close the downlink port 8 linked with the failed uplink port 9, when the failure occurs on the uplink port 9 side.

Which ports are to be linked is set by user. In the example of FIG. 2, a port #1 of the downlink port 8 is linked with a port #9 of the uplink port 9.

In this case, when the cable 6 is unconnected to the port #9, port #1 is closed by the link-state tracking function, and the link between the port #1 and the server 2 is shut down. By detecting this shutdown, the route control unit 10 can detect that the cable 6 is unconnected to the port #9.

However, when the cable 6 is connected to the port #9, the port #1 linked with the port #9 is not closed even when the wiring error exists in that cable 6. Therefore, the route control unit 10 cannot detect the wiring error in the cable 6 by use of the link-state tracking function.

Hereinafter, present embodiments will be described.

First Embodiment

[Entire Configuration]

Figure 3:
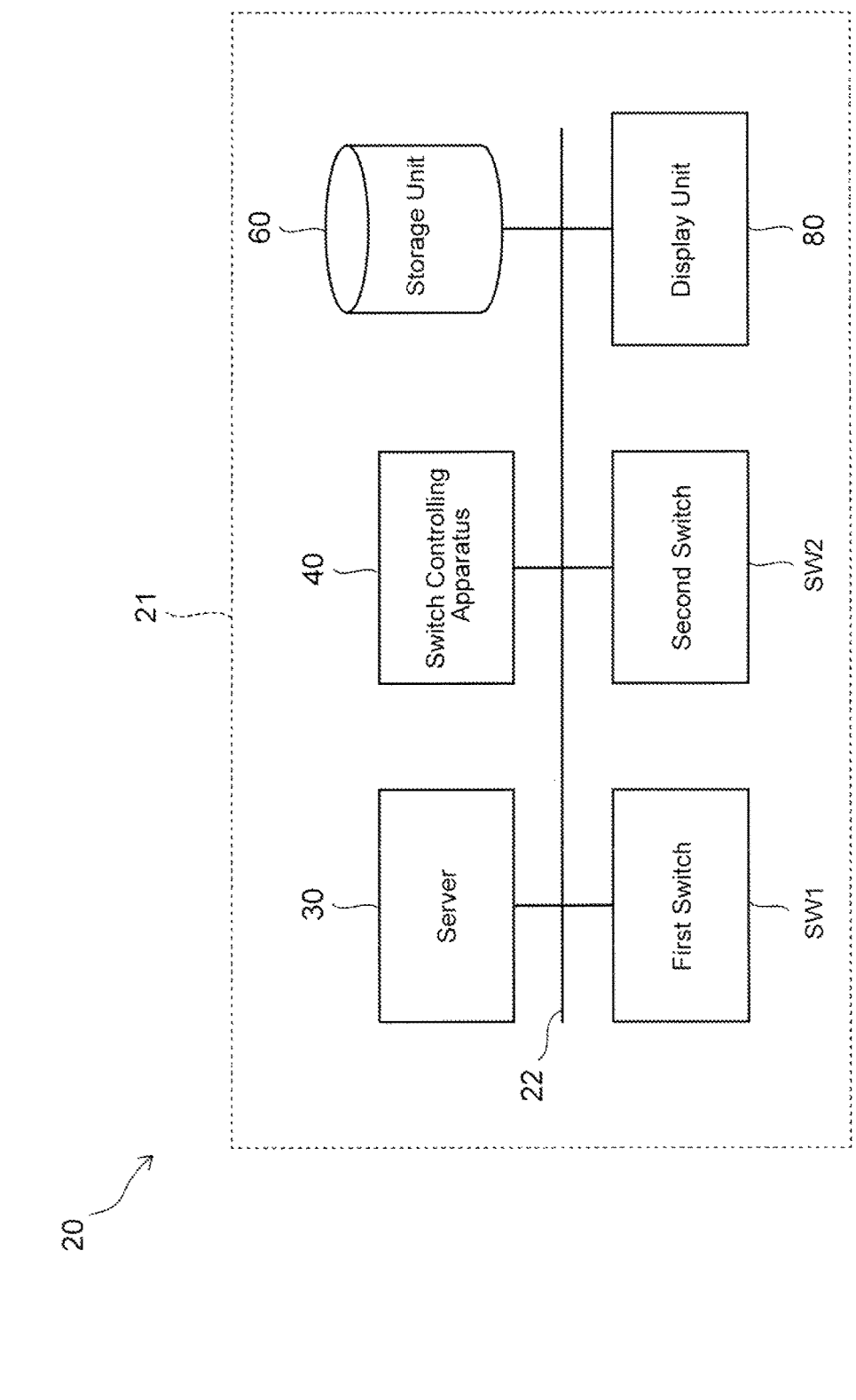
FIG. 3 is a diagram illustrating an example of an entire configuration of a system according to a first embodiment.

FIG. 3 is a diagram illustrating an example of an entire configuration of a system according to the present embodiment.

This system 20 is used in a server rack in a data center, and includes a server 30, a switch controlling apparatus 40, a storage unit 60, a first switch SW1, a second switch SW2, and a display unit 80.

These units are housed in a chassis 21 of the server rack, and communicate with one another through an I2C bus 22.

Note that the server 30 and the switch controlling apparatus 40 are blade servers which are insertable into and removable from the chassis 21. Likewise, the first switch SW1 and the second switch SW2 are blade switches which are insertable into and removable from the chassis 21.

[Configurations of Each Units]

Figure 4:
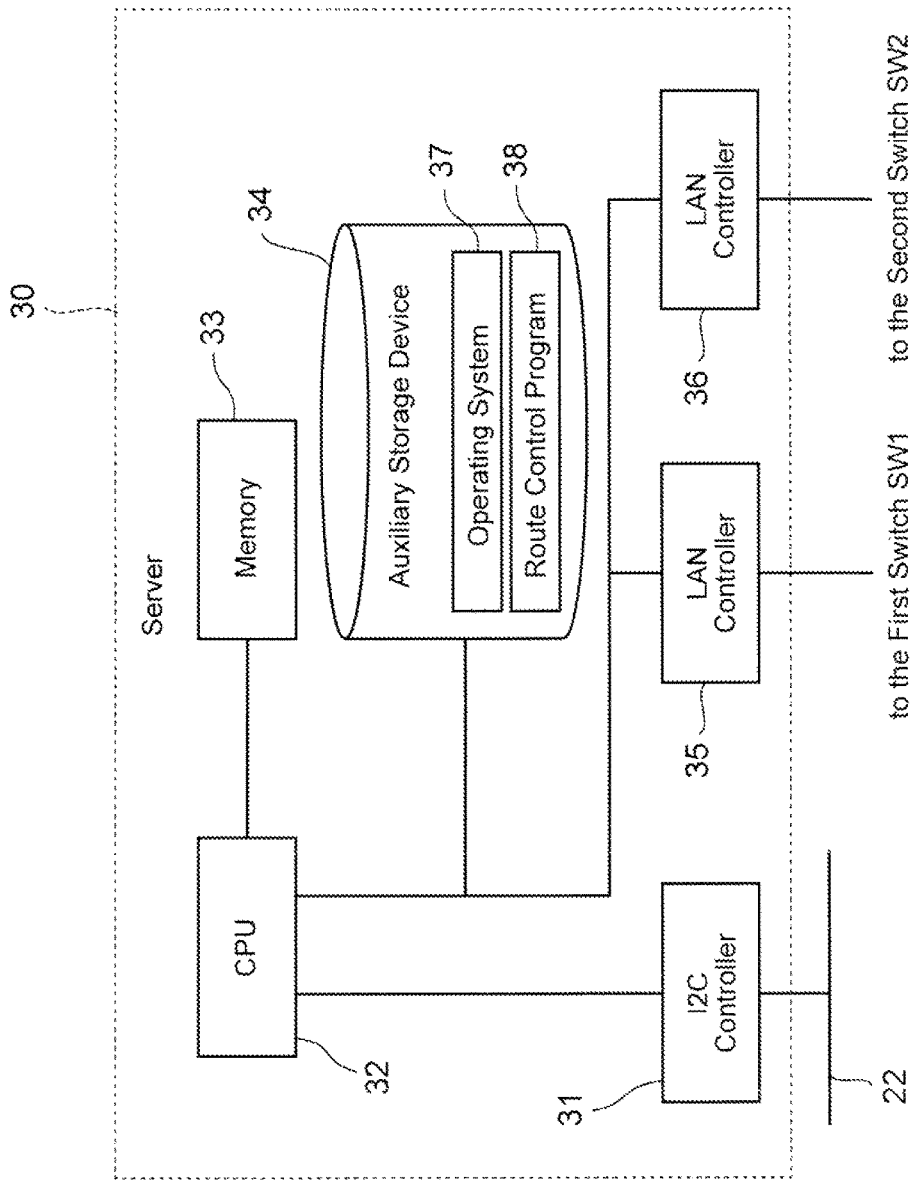
FIG. 4 is a hardware configuration diagram of a server according to the first embodiment.

FIG. 4 is a hardware configuration diagram of the server 30.

The server 30 includes an I2C controller 31, a CPU (central processing unit) 32, a memory 33, an auxiliary storage device 34, a first LAN controller 35, and a second LAN controller 36.

Among them, the auxiliary storage device 34 is a hard disk for example, which stores an operating system 37 and a route control program 38.

Meanwhile, the memory 33 is a RAM (random access memory) for example, on which the operating system 37 and the route control program 38 are loaded.

Moreover, the CPU 32 executes the operating system 37 and the route control program 38 in cooperation with the memory 33.

The first and second LAN controllers 35 and 36 are devices which provide interfaces with the LAN. The I2C controller 31 is a device which provides an interface with the I2C bus 22.

Figure 5:
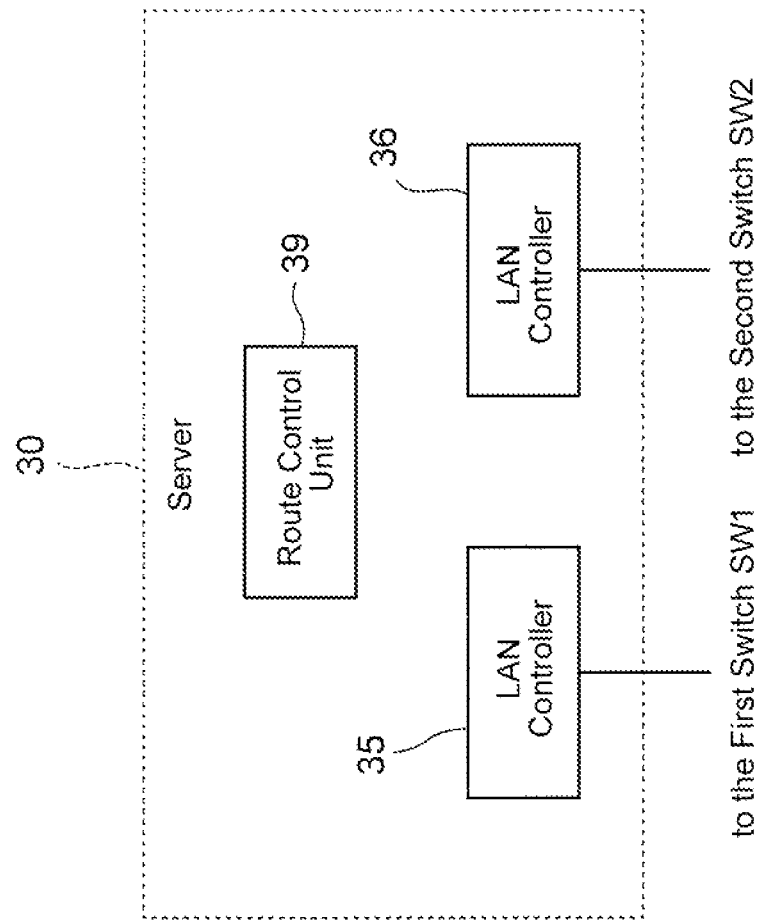
FIG. 5 is a functional configuration diagram of the server according to the first embodiment.

FIG. 5 is a functional configuration diagram of the server 30.

A route control unit 39 is activated in the server 30 as a consequence of execution of the route control program 38 by the CPU 32 in cooperation with the memory 33.

The route control unit 39 monitors whether or not a link is established between the server 30 and the first switch SW1 through the LAN. When the route control unit 39 determines that no link is established therebetween, the route control unit 39 establishes a link with the second switch SW2 through the LAN.

Figure 6:
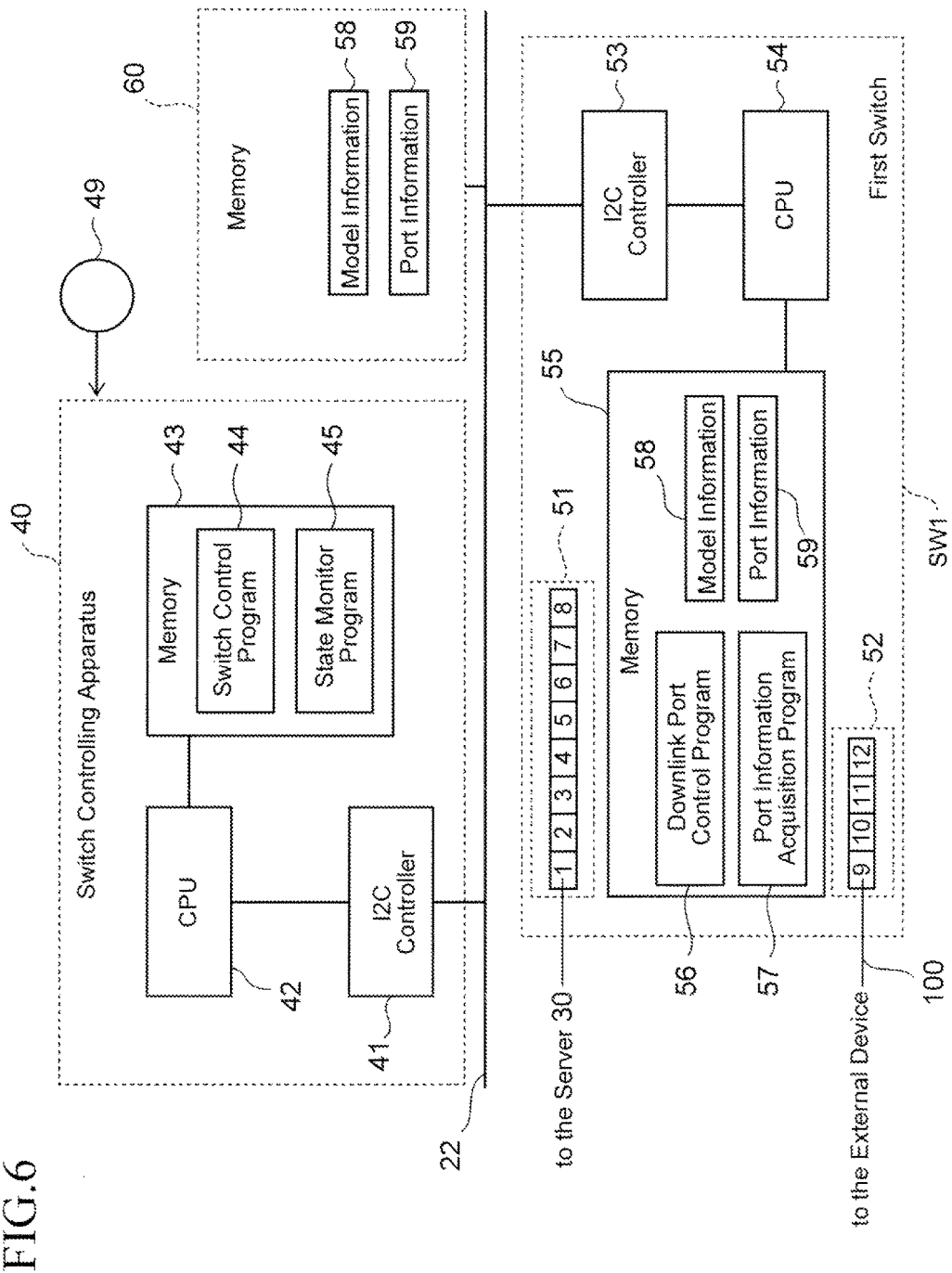
FIG. 6 is a hardware configuration diagram of a switch controlling apparatus, a storage unit, and a first switch according to the first embodiment.

FIG. 6 is a hardware configuration diagram of the switch controlling apparatus 40, the storage unit 60, and the first switch SW1.

Among them, the switch controlling apparatus is a management server, for example, which includes an I2C controller 41, a CPU 42, and a memory 43.

The memory 43 is a RAM for example, on which a switch control program 44 and a state monitor program 45 are loaded.

Instead, the switch control program 44 and the state monitor program 45 may be stored in a computer readable recording medium 49, and the switch controlling apparatus 40 may read out these programs from the recording medium 49.

Example of the recording medium 49 includes physical portable storage media such as a CD-ROM (compact disc—read only memory), a DVD (digital versatile disc), and a USB (universal serial bus) memory. Alternatively, a hard disk drive or a semiconductor memory such as a flash memory may be used as the recording medium 49. These storage media 49 is not a transitory medium such as a carrier wave, which does not have a physical form.

Further, the switch control program 44 and the state monitor program 45 may be stored in a device connected to any of a public line, the Internet, the LAN, and the switch controlling apparatus 40 may read out these programs and execute them.

Meanwhile, the CPU 42 executes the switch control program 44 and the state monitor program 45 in cooperation with the memory 43.

Further, the I2C controller 41 is a device which provides an interface with the I2C bus 22.

On the other hand, the first switch SW1 is an L2 switch which includes a plurality of downlink ports 51, a plurality of uplink ports 52, an I2C controller 53, a CPU 54, and a memory 55.

The downlink ports 51, which are LAN port, are examples of first ports. These downlink ports 51 are connected to the server 30 via LAN. The uplink ports 52, which are LAN port, are examples of second ports. These uplink ports 52 are connected to an external device located outside the chassis 21 (see FIG. 3) via LAN cables 100.

Moreover, data such as Ethernet frames are transferred between each of the plurality of the downlink ports 51 and the corresponding one of the plurality of the uplink ports 52.

Meanwhile, the memory 55 is a RAM for example, which stores a downlink port control program 56 and a port information acquisition program 57.

In addition, the memory 55 stores model information 58 indicating the model of the switch in which the memory 55 is provided, and port information including connection destinations of the uplink ports 52 of the switch in which the memory 55 is provided.

The CPU 54 executes the downlink port control program 56 and the port information acquisition program 57 in cooperation with the memory 55.

Further, the I2C controller 53 is a device which provides an interface with the I2C bus 22.

Note that the hardware configuration of the second switch SW2 is the same as that of the first switch SW1, and description thereof will be omitted.

Meanwhile, the storage unit 60 is a RAM for example, which stores the model information 58 and the port information 59 which are transferred from the first switch SW1 via the I2C bus 22.

Figure 7:
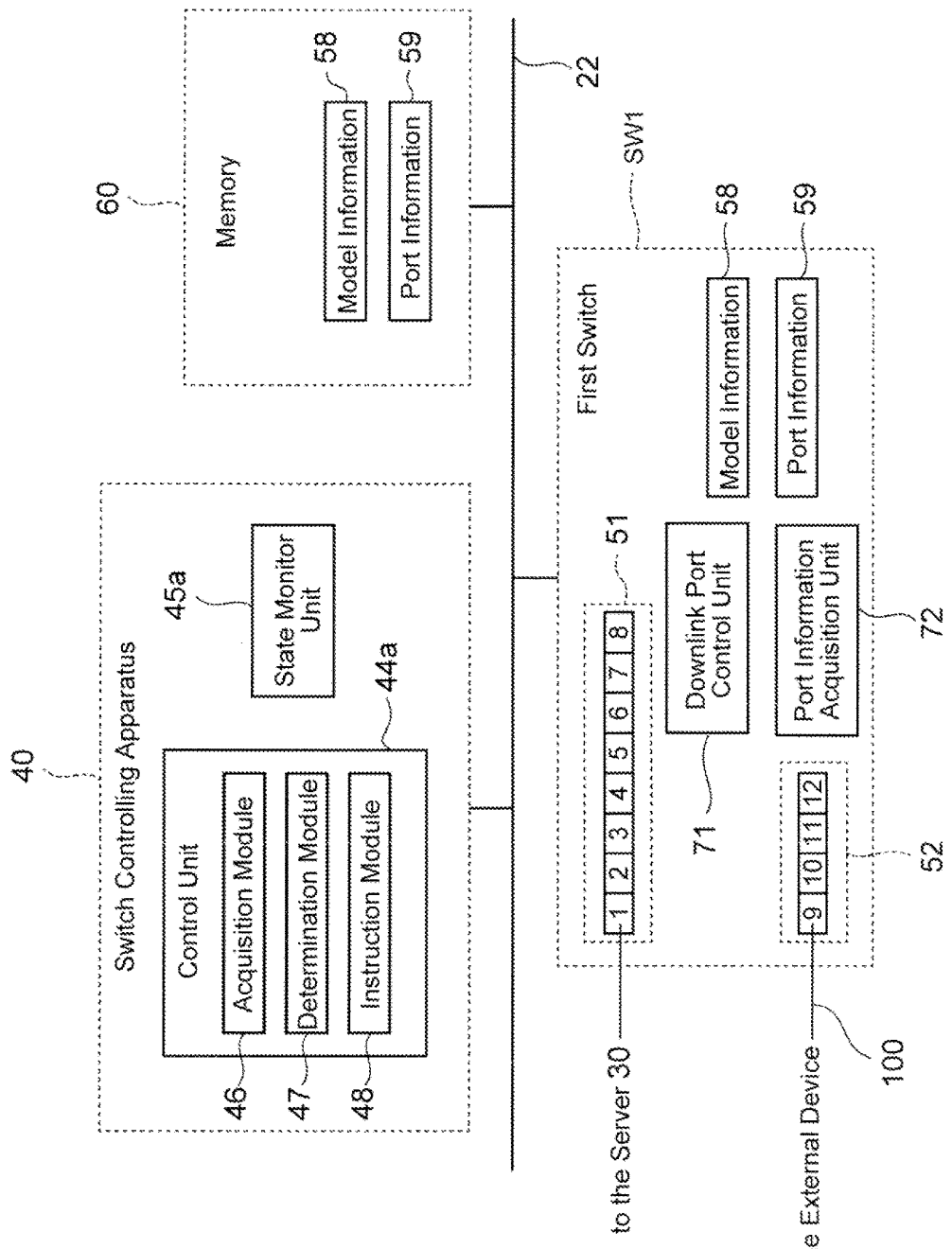
FIG. 7 is a functional configuration diagram of the switch controlling apparatus, the storage unit, and the first switch according to the first embodiment.

FIG. 7 is a functional configuration diagram of the switch controlling apparatus 40, the storage unit 60, and the first switch SW1.

As illustrated in FIG. 7, a control unit 44a and a state monitor unit 45a are activated in the switch controlling apparatus 40.

The control unit 44a is realized by causing the CPU 42 to execute the switch control program 44 in cooperation with the memory 43.

The control unit 44a includes an acquisition module 46, a determination module 47, and an instruction module 48.

The acquisition module 46 acquires the model information 58 and the port information 59 held in the first switch SW1 and the second switch SW2. Then, acquisition module 46 transfers the model information 58 and the port information 59 to the storage unit 60, and causes the storage unit 60 to store the model information 58 and the port information 59 therein. Here, the acquisition and transfer of the model information 58 and the port information 59 is carried out via the I2C bus 22.

The determination module 47 compares the port information 59 on the first switch SW1 before swapping with the port information 59 on the first switch SW1 after swapping. This comparison is performed between the uplink port 52 of the first switch SW1 before swapping and the corresponding uplink port 52 of the first switch SW2 after swapping. Then, on the basis of the comparison results, the determination module 47 determines whether or not there exists some second ports 52 whose connection destination is unchanged before and after the swapping.

After the first switch SW1 is swapped, the instruction module 48 instructs the first switch SW1, which is newly provided in the system 20 by the swapping, to close its downlink ports 51.

When the first switch SW1 is swapped in this manner, unless an operator makes a mistake in connecting the uplink port 52 to the corresponding LAN cable 100, the external device connected to the uplink port 52 is the same before and after the swapping. When there exists such a second port 52 whose connection destination is the same before and after the swapping, the instruction module 48 instructs the first switch SW1 to open the downlink port 51, which transfers data with the uplink port 52 whose connection destination is the same before and after the swapping.

Note that when the connection destination of the uplink port 52 is the same before and after the swapping, such a situation is referred to as "the LAN cable 100 is correctly connected to the uplink port 52" or "the uplink port 52 has correct connection".

On the other hand, the state monitor unit 45a is realized by causing the CPU 42 to execute the state monitor program 45 in cooperation with the memory 43. The state monitor unit 45a detects insertion of the first and second switches SW1 and SW2 into the chassis 21 (see FIG. 3) and removal of the first and second switches SW1 and SW2 from the chassis 21. Moreover, the state monitor unit 45a also has a function to detect a breakdown of the first and second switches SW1 and SW2.

In the first switch SW1, a downlink port control unit 71 and a port information acquisition unit 72 are activated. Note that the second switch SW2 has the same functional configuration as that of the first switch SW1, and description thereof will be omitted.

The downlink port control unit 71 is a function realized by causing the CPU 54 to execute the downlink port control program 56 in cooperation with the memory 55. The downlink port control unit 71 close or open the downlink ports 51 upon receipt of instructions from the instruction module 48.

The port information acquisition unit 72 is a function realized by causing the CPU 54 to execute the port information acquisition program 57 in cooperation with the memory 55. The port information acquisition unit 72 acquires connection destinations of each of the plurality of uplink ports 52 by means of an LLDP (link layer discovery protocol), and incorporates these connection destinations into the port information 59.

FIG. 8 is a diagram illustrating an example of the port information 59.

As illustrated in FIG. 8, the port information 59 includes a switch number for identifying the first switch SW1. Moreover, link states and connection destinations are stored in the port information 59 in such a way as to correspond to respective port numbers of the plurality of uplink ports 52.

The link state represents whether or not the uplink port 52 is connected to the external device of the connection destination via the LAN cable 100. The state in which two ends of the LAN cable 100 are connected to the devices is referred to as link-up, and the state in which one of the ends of the LAN cable 100 is not connected to the devices is referred to as link-down.

Meanwhile, each connection destination represents information for uniquely identifying the connection destination acquired by the LLDP. For example, a MAC (media access control) address, a serial number, a port number and the like may be used as the connection destination. In the example of FIG. 8, external switches #1 to #4 and port numbers thereof are used as the connection destinations.

Figure 9:
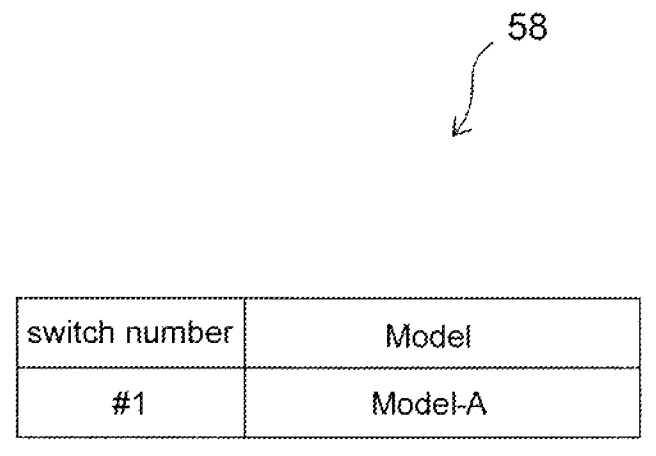

In the meantime, FIG. 9 is a diagram illustrating an example of the model information 58 held in the first switch SW1.

As illustrated in FIG. 9, in the model information 58, a switch number for identifying the first switch SW1 is linked with the model of the switch itself. Note that the second switch SW2 also holds similar model information 58.

Figure 10:
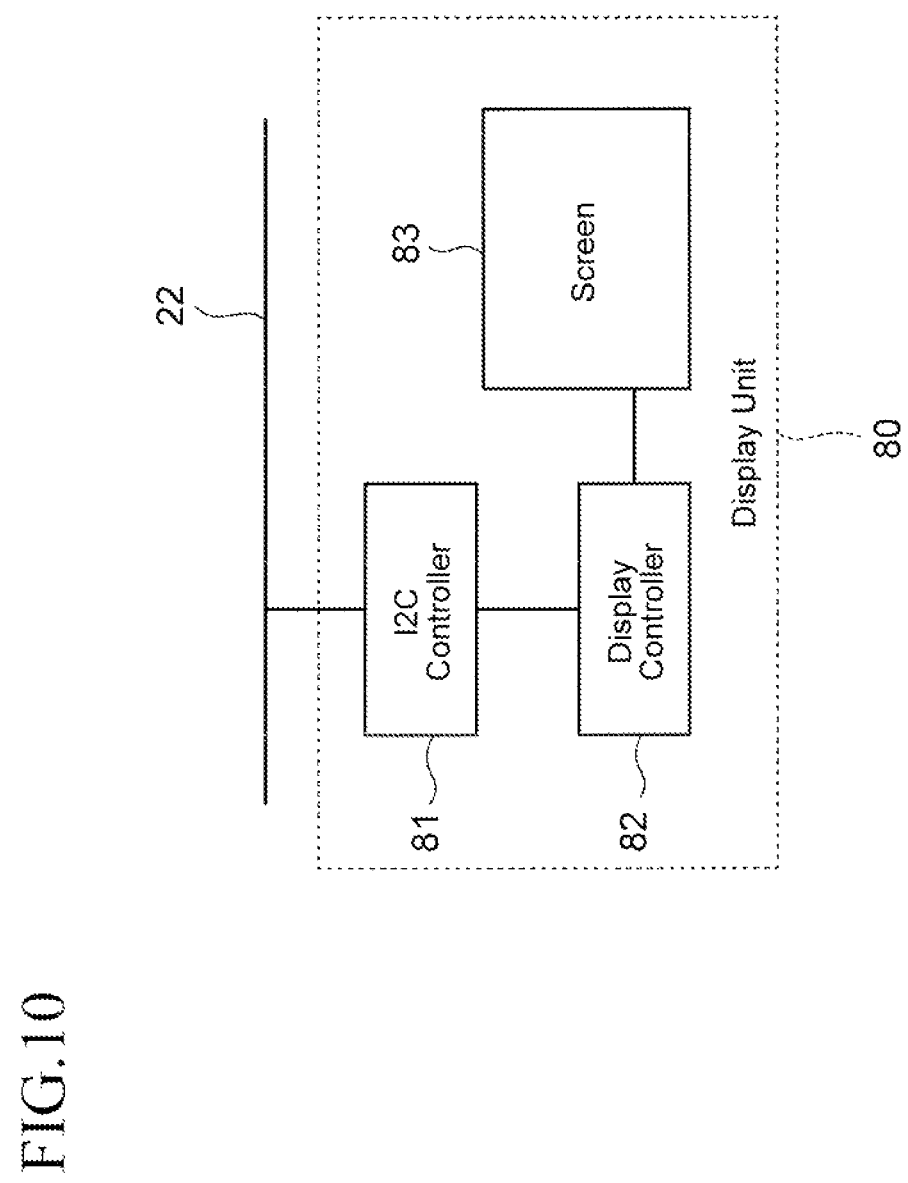
FIG. 10 is a hardware configuration diagram of a display unit according to the first embodiment.

FIG. 10 is a hardware configuration diagram of the display unit 80.

The display unit 80 includes an I2C controller 81, a display controller 82, and a screen 83.

Among them, the I2C controller 81 provides an interface with the I2C bus 22. Further, the display controller 82 generates image data to be displayed on the screen 83, on the basis of data acquired via the I2C controller 81.

Meanwhile, the screen 83 is a touch panel for example, which displays various images under the control of the display controller 82.

Figure 11:
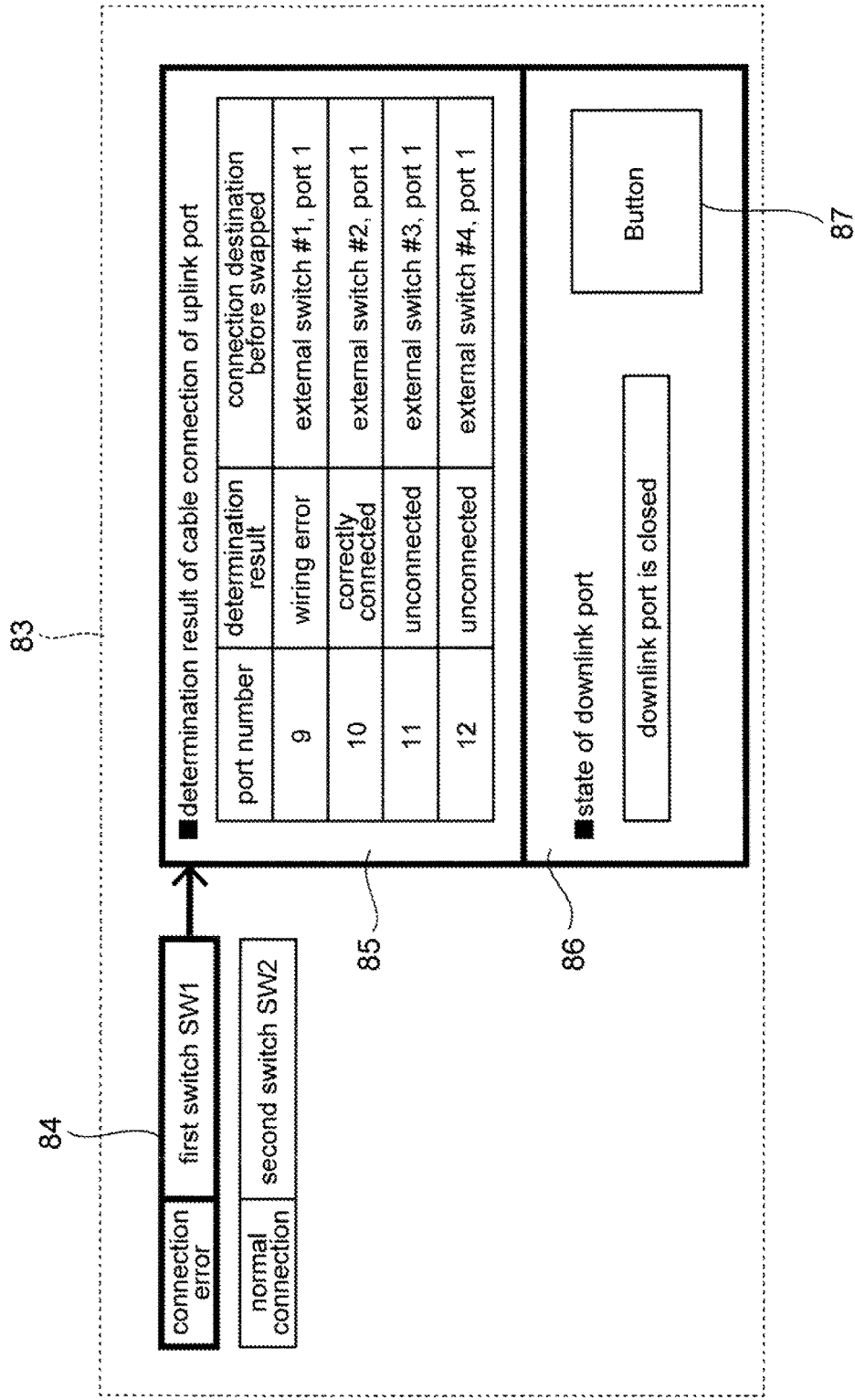
FIG. 11 is a diagram illustrating a display example on a screen according to the first embodiment.

FIG. 11 is a diagram illustrating a display example on the screen 83.

As illustrated in FIG. 11, a switch display section 84, an uplink port display section 85, a downlink port display section 86, and a button 87 are displayed on the screen 83.

Among them, the switch display section 84 indicates which of information on the first switch SW1 and information on the second switch SW2 is displayed on the screen 83.

In the uplink port display section 85, a "port number" of the uplink port 52, and a "determination result" as to whether or not the cable is correctly connected to the port are displayed. Also, "connection destination before swapped" of the uplink port is also displayed on the screen 83.

In this example, the external switches #1 to #4 and the ports thereof are displayed as the "connection destinations before swapped".

Moreover, the downlink port display section 86 displays information indicating whether or not all the downlink ports 51 are closed.

Note that the button 87 is used for forcibly opening the downlink ports 51, on the basis of determination by a user.

[Network Configuration]

Figure 12:
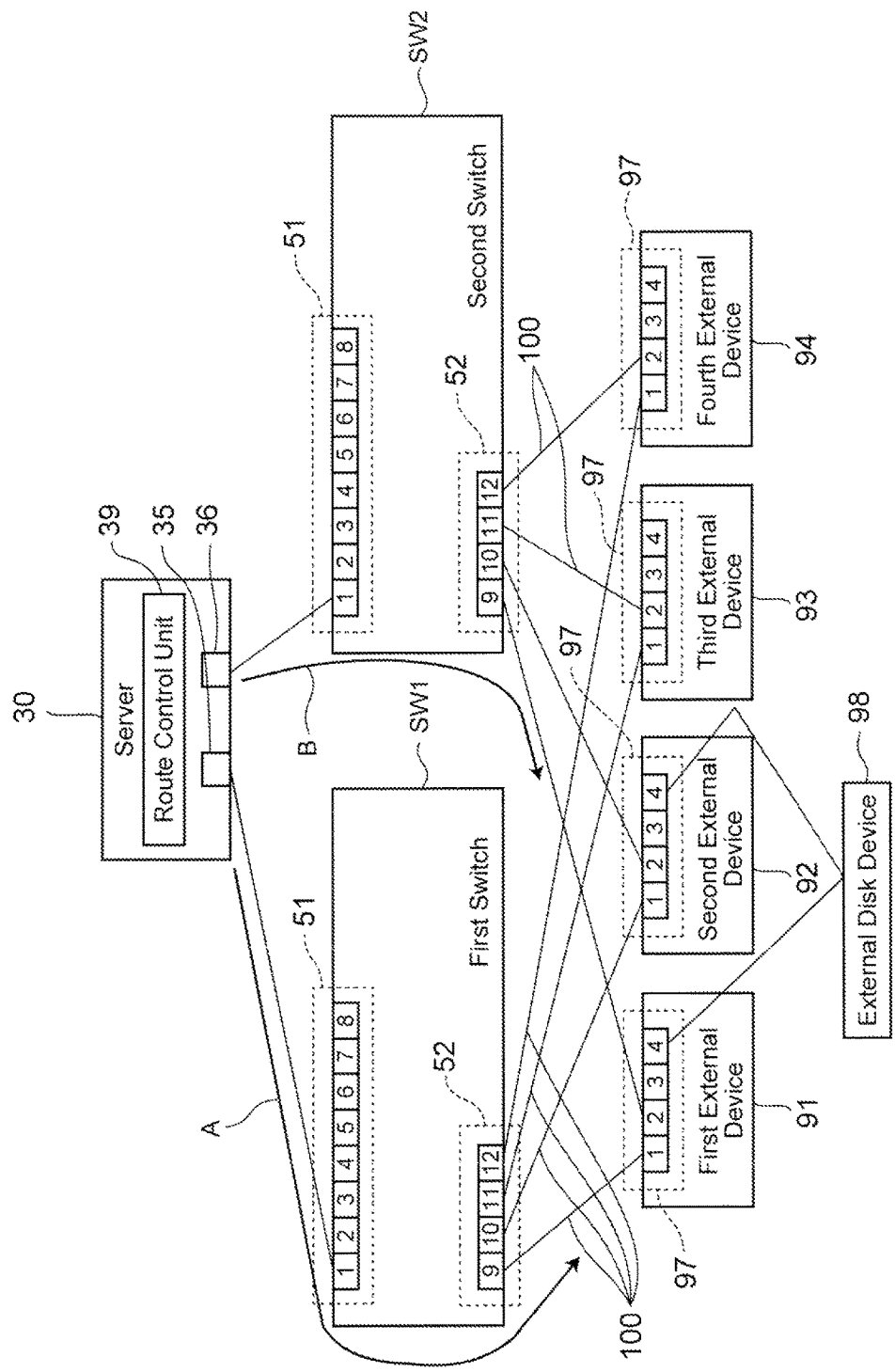
FIG. 12 is a configuration diagram of a network according to the first embodiment.

FIG. 12 is a configuration diagram of a network of the present embodiment.

In this example, redundant switching is achieved by connecting the two switches of the first switch SW1 and the second switch SW2 to the server 30. In this case, the first switch SW1 serves as an active system and the second switch SW2 serves as a standby system, for example.

While wire connection is not particularly limited, a port #1 among the plurality of downlink ports 51 of the first switch SW1 is connected to the first LAN controller 35, for example. In addition, a port #1 among the plurality of downlink ports 51 of the second switch SW2 is connected to the second LAN controller 36.

These connections are established by using an unillustrated wiring board located in the chassis 21 (see FIG. 3). Accordingly, there is no need to provide LAN cables for connecting the downlink ports 51 of the switches SW1 and SW2 to the server 30.

Meanwhile, on the uplink ports 52 of the first and second switches SW1 and SW2, there are provided external switches serving as first to fourth external devices 91 to 94. These external switches is either an L2 switch or an L3 (Layer 3) switch for example, which corresponds to the external switches #1 to #4 listed on the "connection destinations before swapped" in FIG. 11.

Moreover, ports 97 of the external devices 91 to 94 are connected to the uplink ports 52 of the first and second switches SW1 and SW2 by using the LAN cables 100.

In order to realize the aforementioned redundant configuration of the first and the second switches SW1, SW2, the uplink ports 52 of the switches SW1 and SW2 labeled with the same port number are connected to the same external device.

For example, ports #9 of the uplink ports 52 of the first switch SW1 and the second switch SW2 are connected to the first external device 91. Likewise, ports #10 of the uplink ports 52 of the first switch SW1 and the second switch SW2 are connected to the second external device 92.

Meanwhile, ports #4 of the first external device 91 and the second external device 92 are connected to an external disk device 98.

According to the above-described configuration, when the first switch SW1 is in normal operation, data are transmitted and received between the server 30 and the external disk device 98 along a route A which passes through the first switch SW1.

On the other hand, when the first switch SW1 breaks down, the route control unit 39 detects the breakdown of the first switch SW1. Then, the route control unit 39 switches the data transfer route to a route B which passes through the second switch SW2.

When the first switch SW1 is broken down in this manner, the first switch SW1 is to be swapped by an operator.

A method of controlling a switch associated with the swapping of the switch will be described below.

[Method of Controlling Switch]

A method of controlling a switch of the present embodiment will be described below. The description will be made for the two case, the case where the first switch SW1 is in normal operation and the case where the first switch SW1 is to be swapped.

<When First Switch SW1 is in Normal Operation>

Figure 13:
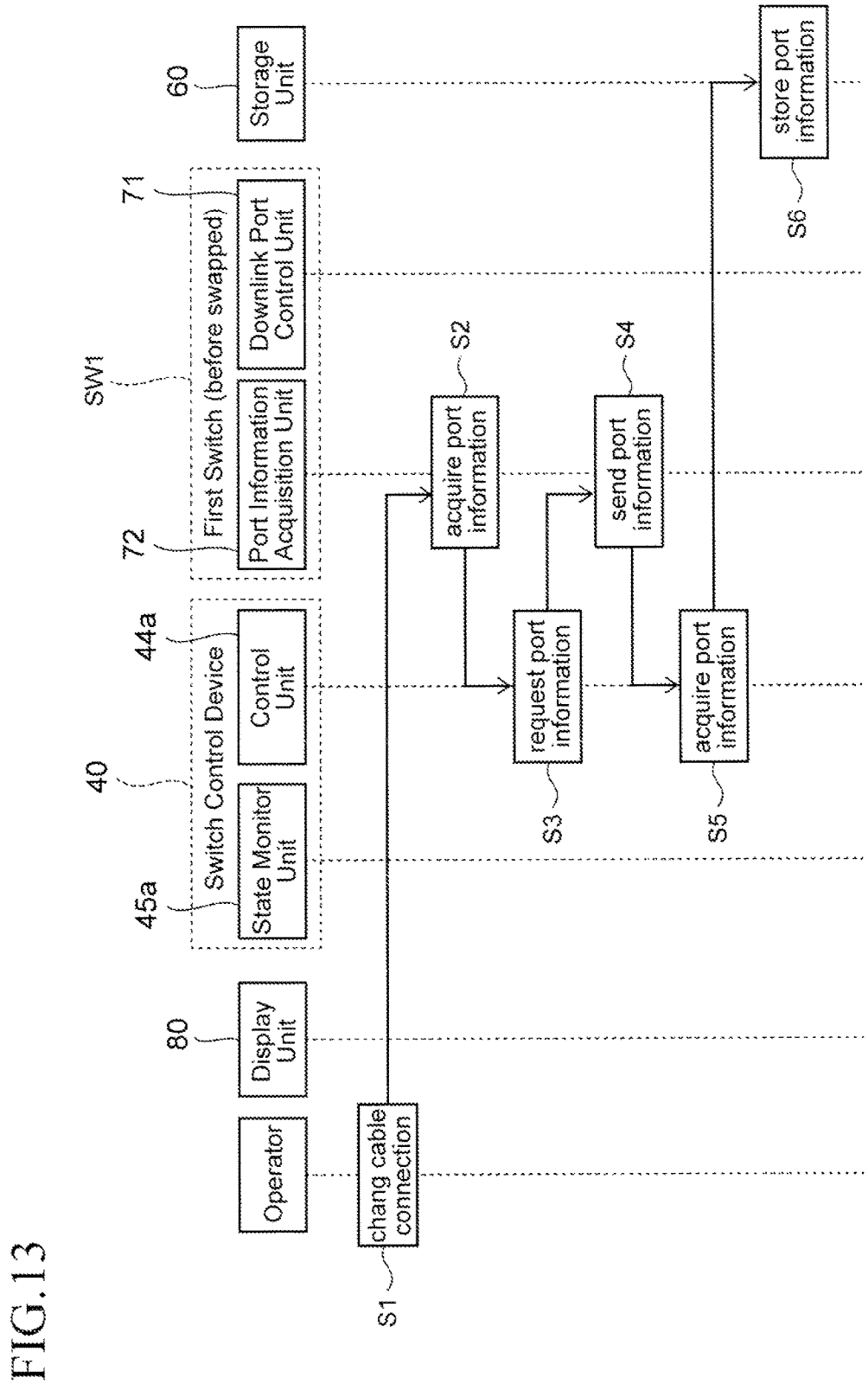
FIG. 13 is a flowchart illustrating a method of controlling a switch, in the case where the first switch is in normal operation in the first embodiment.

FIG. 13 is a flowchart illustrating the method of controlling a switch in the case where the first switch SW1 is in normal operation.

In this case, in step S1, an operator connects new LAN cables 100 to the uplink ports 52 of the first switch SW1 in the course of regular maintenance and the like.

Next, the method proceeds to step S2 and the port information acquisition unit 72 detects that the LAN cable 100 is connected to the first switch SW1. Triggered by this detection, the port information acquisition unit 72 acquires new connection destinations of the LAN cables 100 and updates the "connection destinations" of the port information 59 (see FIG. 8).

Then, the method proceeds to step S3.

In step S3, the acquisition module 46 (see FIG. 7) in the control unit 44a of the switch controlling apparatus 40 requests the port information 59 from the first switch SW1. Here, the acquisition module 46 is configured to periodically request the port information 59, and the request in this step takes place as one of the periodic requests.

Next, the method proceeds to step S4. In step S4, upon receipt of the aforementioned request, the port information acquisition unit 72 sends the port information 59 to the acquisition module 46.

Hence, the acquisition module 46 of the control unit 44a acquires the port information 59 in step S5.

The port information 59 includes the plurality of uplink ports 52 and the connection destinations corresponding thereto as illustrated in FIG. 8. In step S5, the acquisition module 46 acquires the connection destination for each of the plurality of the uplink ports 52.

Thereafter, the method proceeds to step S6 and the acquisition module 46 stores the port information 59 in the storage unit 60.

Here, in the storage unit 60, the acquisition module 46 stores not only the port information 59 but also the model information 58 (see FIG. 9) on the first switch SW1 in advance.

Thus, the basic steps of the method of controlling a switch in the case where the first switch SW1 is in normal operation are completed.

<When First Switch SW1 Breaks Down>

Next, a description will be given of the method of controlling a switch in the case where the first switch SW1 breaks down.

In this case, the first switch SW1 is to be swapped. Here, during the swapping, the LAN cable 100 may be incorrectly connected to the first switch SW1 due to a mistake of an operator. In order to prevent the system from being operated in the situation where the such a wiring error exists, the switches are controlled in the present embodiment as described below.

FIGS. 14A to 14E are flowcharts illustrating the method of controlling a switch in the case where the first switch SW1 breaks down.

In this case, in step S10, the state monitor unit 45a of the switch controlling apparatus 40 detects the occurrence of the breakdown of the first switch SW1, and then notifies the display unit 80 of the breakdown.

In the meantime, when the breakdown occurs in this manner, the link between the first switch SW1 and the server 30 is no longer established. Therefore, as illustrated in FIG. 12, the route control unit 39 of the server 30 switches the data transfer route from the route A to the route B.

Next, the method proceeds to step S11. In step S11, upon receipt of the notification from the state monitor unit 45a, the display unit 80 displays the occurrence of the breakdown.

Subsequently, the method proceeds to step S12 and the operator confirms the display unit 80. As the operator recognizes the breakdown of the first switch SW1, the operator disconnects the LAN cables 100 from the first switch SW1 in order to swap the first switch SW1.

Then, the method proceeds to step S13 and the operator swap the first switch SW1 for a new first switch SW1.

Next, the method proceeds to step S14. In step S14, the state monitor unit 45a of the switch controlling apparatus 40 detects insertion of the new first switch SW1 into the chassis 21, and sends notification of the insertion to the instruction module 48 (see FIG. 7) of the control unit 44a.

In step S15, the instruction module 48 that receive the notification instructs downlink port control unit 71 of the swapped new first switch SW1 to close each of the downlink ports 51 of the first switch SW1.

Then, the method proceeds to step S16. In step S16, the downlink port control unit 71 thus instructed close each of the plurality of downlink ports 51, and then notifies the instruction module 48 of completion of the closing.

As illustrated in FIG. 12, when the downlink ports 51 are closed in this manner, no links are established between the downlink ports 51 of the first switch SW1 and the server 30. Therefore, the route control unit 39 continues to use the route B.

In the meantime, even when a wiring error occurs between the uplink port 52 and the LAN cable 100 during the operator's work and the uplink ports 52 are linked up to the external devices 91 to 94 in this state, the route control unit 39 of the server determines that the route A passing through the first switch SW1 cannot be used.

As a result, such a situation where the server 30 is connected to the wrong external devices 91 to 94 due to the wiring error can be prevented from occurring. In addition, it is not necessary to waste time to bring the data transfer route back from the route A to the route B again under the control of the route control unit 39 (see FIG. 5) for the purpose of fixing the wiring error. Thus, availability of the system can be increased.

Figure 14A:
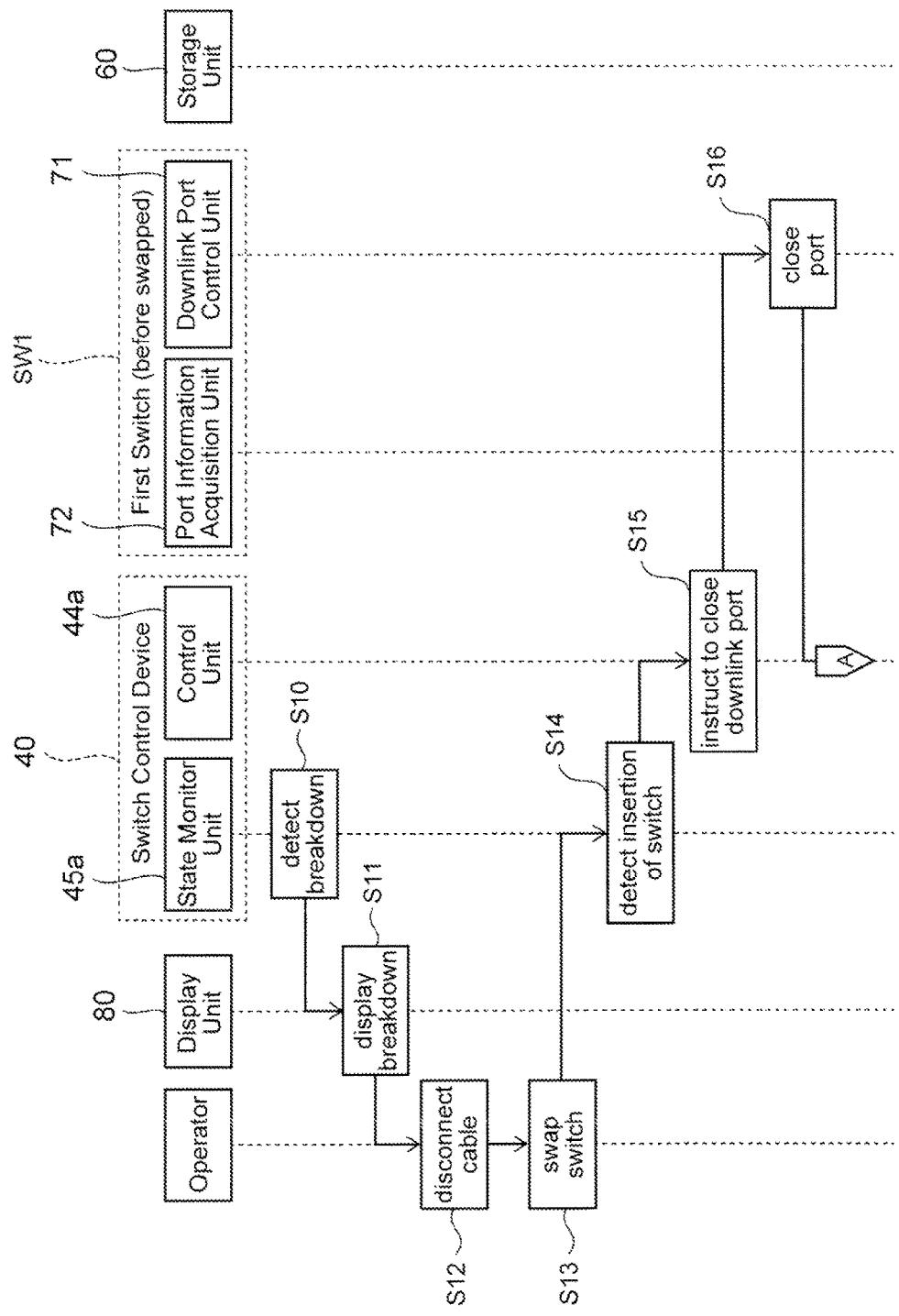
FIGS. 14A to 14E are flowcharts illustrating the method of controlling a switch, in the case where the first switch breaks down in the first embodiment.
Figure 14B:
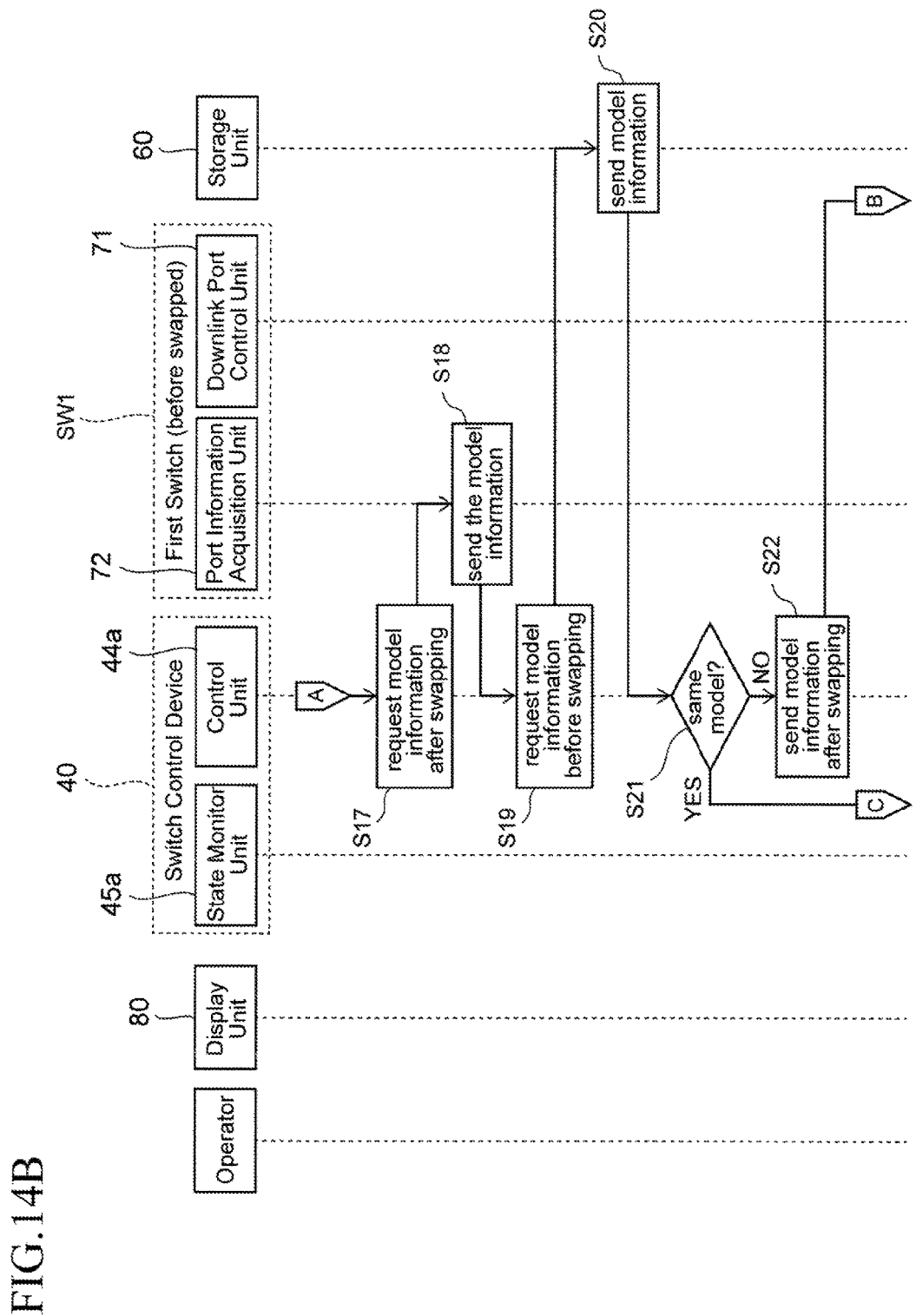
Figure 14C:
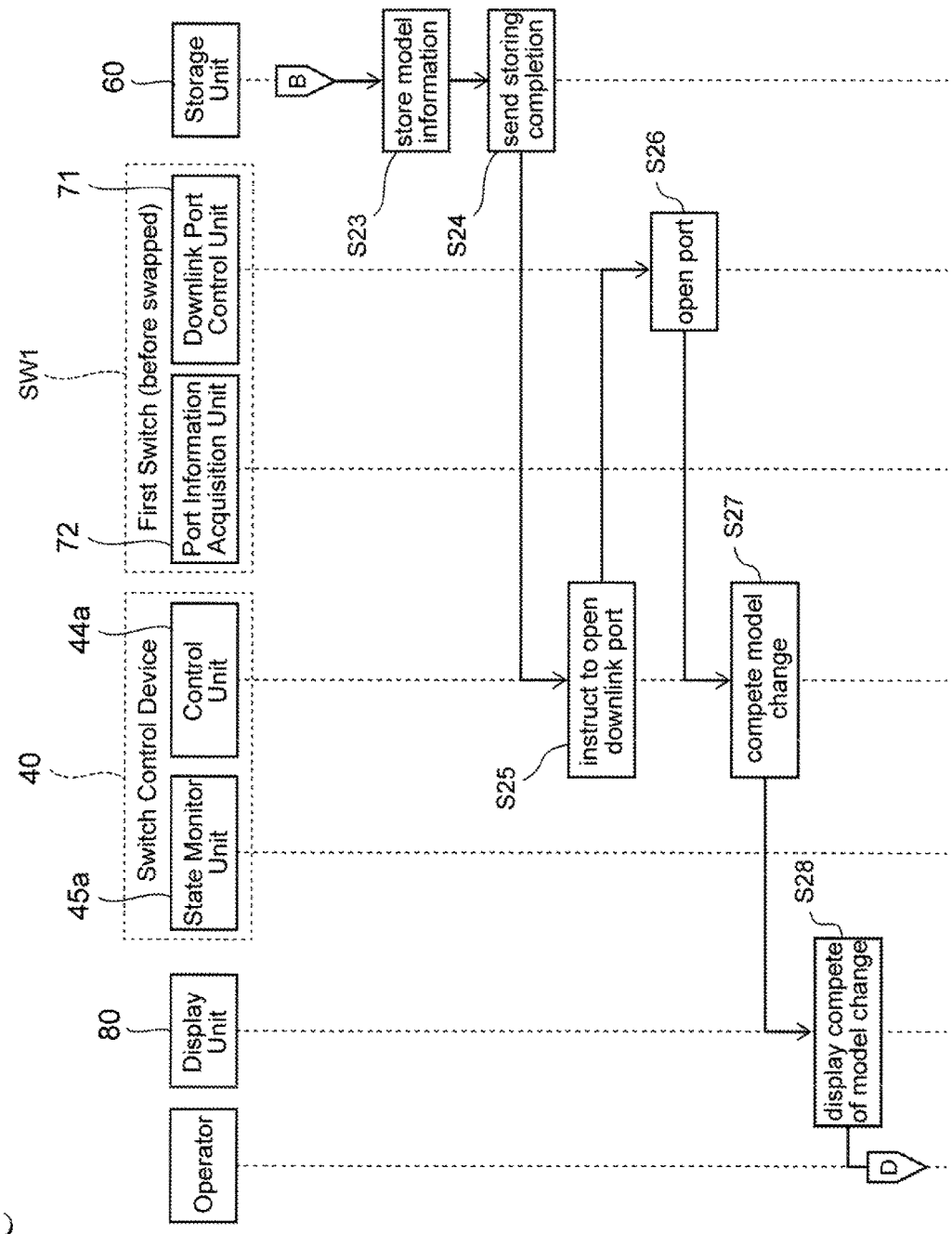

Next, the method proceeds to step S17 of FIG. 14B. In step S17, the acquisition module 46 of the control unit 44a requests model information 58, which indicates the model of the swapped new first switch SW1, from the port information acquisition unit 72 of the first switch SW1.

Upon receipt of the request, the port information acquisition unit 72 sends the model information 58 on the swapped new first switch SW1 to the acquisition module 46 in step S18. Thus, the acquisition module 46 acquires the model information 58 on the swapped new first switch SW1.

Subsequently, the method proceeds to step S19 and the acquisition module 46 requests model information 58 on the old first switch SW1 before swapped from the storage unit 60.

Upon receipt of the request, the storage unit 60 sends the model information 58 on the old first switch SW1 before swapped to the acquisition module 46 in step S20. Thus, the acquisition module 46 acquires the model information 58 on the old first switch SW1 before swapped.

Subsequently, the method proceeds to step S21. In step S21, the determination module 47 (see FIG. 7) determines whether or not the model contained in the model information 58 on the old first switch SW1 before swapped is the same as the model contained in the model information 58 on the swapped new first switch SW1.

Here, when these models are determined to be not the same (NO), it follows that what the operator does is not the swapping of the first switch SW1 but is a model change of the first switch SW1.

In the case of the model change, the number of the uplink ports 52 of the first switch SW1 changes before and after the swapping in some cases. Therefore, the connection destinations of the uplink ports 52 after the swapping may naturally be considered as being different from those before the swapping.

Accordingly, in this case, the method proceeds to step S22 of FIG. 14B, while skipping determination process of step S32 (see FIG. 14D) to be described later, which is to determine whether or not the LAN cables 100 are correctly connected to the swapped new first switch SW1.

In step S22, the acquisition module 46 of the control unit 44a sends the model information 58 on the swapped new first switch SW1 to the storage unit 60.

Then, the method proceeds to step S23 and the storage unit 60 stores the model information 58 on the swapped new first switch SW1.

Next, the method proceeds to step S24 and the storage unit 60 notifies the switch controlling apparatus 40 that the storing of the model information 58 is completed.

At this stage, the downlink ports 51 are kept closed as executed in step S16. Therefore, the server 30 cannot use the first switch SW1 in this state.

To deal with this problem, in the next step S25, the instruction module 48 instructs the downlink port control unit 71 to open all of the downlink ports 51.

Then, upon receipt of the instruction, the downlink port control unit 71 open all of the downlink ports 51 of the first switch SW1 and notifies the instruction module 48 that the opening of the downlink ports 51 is completed.

Thus, the links between the downlink ports and the server 30 are established. Accordingly, the route control unit 39 (see FIG. 12) of the server determines that the first switch SW1 is usable, and the route control unit 39 brings the data transfer route back from the route B to the route A.

Subsequently, the method proceeds to step S27. In step S27, the instruction module 48, which is notified that the opening of the downlink ports 51 is completed in the above, determines that the model change is completed and notifies the display unit 80 that the model change is completed.

Then, in step S28, the display unit 80 displays information that the model change is completed.

By these steps, the process in the case of the model change of the first switch SW1 is completed.

Figure 14D:
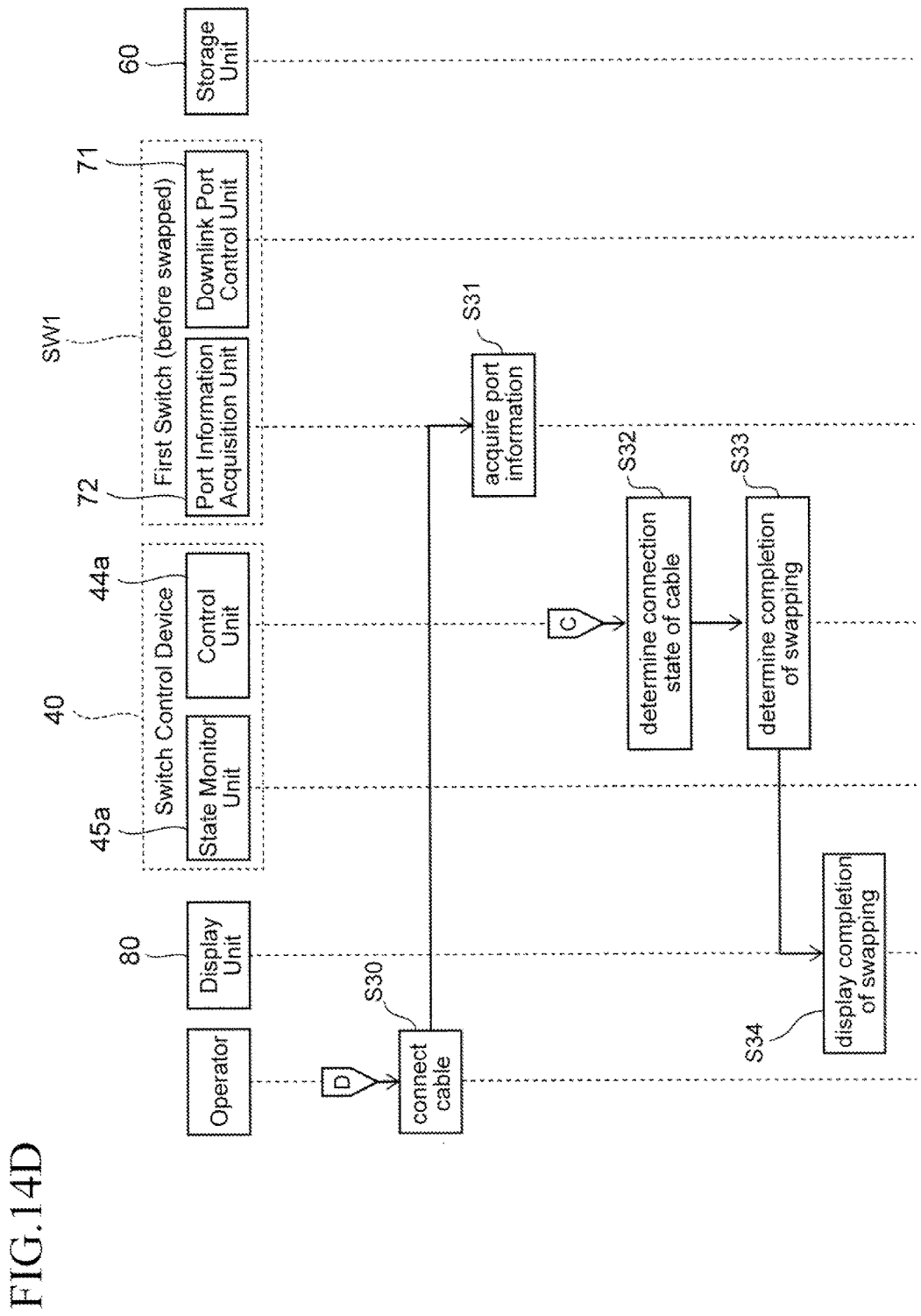

On the other hand, regardless of the result of determination in step S21, in step S30 of FIG. 14D, the operator connects the LAN cables 100 to the swapped new first switch SW1.

Then, the method proceeds to step S31 and the port information acquisition unit 72 detects that the LAN cables 100 is connected to the first switch SW1 in which the port information acquisition unit 72 is provided. Triggered by this detection, the port information acquisition unit 72 acquires the new connection destinations of the LAN cables 100 and updates the "connection destinations" of the port information 59 (see FIG. 8) held in the first switch SW1.

Here, when the models are determined to be the same (YES) in the aforementioned step S21 and when the connection of the LAN cables 100 in step S30 is complete, the method proceeds to step S32.

Since the models are the same in this case, this case is not the model change but is the swapping of the broken first switch SW1 for the new first switch SW1 having the same configuration. Here, the operator may make a mistake in connecting the LAN cable 100 during the swapping in this case.

Accordingly, in step S32, the control unit 44a conducts the determination process that determines whether or not the LAN cable 100 is correctly connected to the swapped new first switch SW1.

FIG. 15 is a schematic diagram illustrating determination rules in the determination process.

The determination is carried out for each of the uplink ports 52. Determination criteria in this determination include the link states of the uplink ports 52 before swapping, the link states of the uplink ports 52 after swapping, and the comparison result of connection destinations which is obtained by comparing the connection destinations of the uplink ports 52 before and after the swapping.

Moreover, the determination pattern includes the following patterns A to D.

Pattern A

This pattern is the pattern in which the connection destination of the concerned uplink port 52 after the swapping is the same as that before the swapping.

When the connection destinations are the same in this manner, the LAN cable 100 can be deemed to be correctly connected to the uplink port 52 after the swapping. Therefore, in this case, the LAN cable 100 is determined to be correctly connected to the uplink port 52 irrespective of the link state.

Pattern B

This pattern is the pattern in which the concerned uplink port 52 is in the state of link-down both before and after the swapping. In this case, since link is down after the swapping, it is not possible to acquire the connection destination after the swapping.

Nevertheless, link-down may possibly occur before and after the swapping due to the trouble caused in the device of the connection destination. Therefore, the connection is determined to be correct in this case as well.

Pattern C

This pattern is the pattern in which the connection destination of the target uplink port 52 before the swapping does not coincide with the connection destination thereof after the swapping.

When the connection destinations are not coincide with each other in this manner, it can be said that a terminal end of the cable connected to the uplink port 52 after the swapping is connected to a different connection destination from that before the swapping.

Therefore, in this case, the LAN cable 100 is determined to have a wiring error irrespective of the link state.

Pattern D

This pattern is the pattern in which the link state of the concerned uplink port 52 is link-up before the swapping but is link-down after the swapping. In this case, it is not possible to acquire the information on the connection destination after the swapping since the link is down after the swapping.

The reason why the link-up state before the swapping becomes the link-down state after the swapping is considered that the LAN cable 100 is not connected to the uplink port 52.

Therefore, in this case, the cable is determined to be unconnected.

Next, the determination process in step S32 on the basis of the above-described determination rules will be described.

Figure 16A:
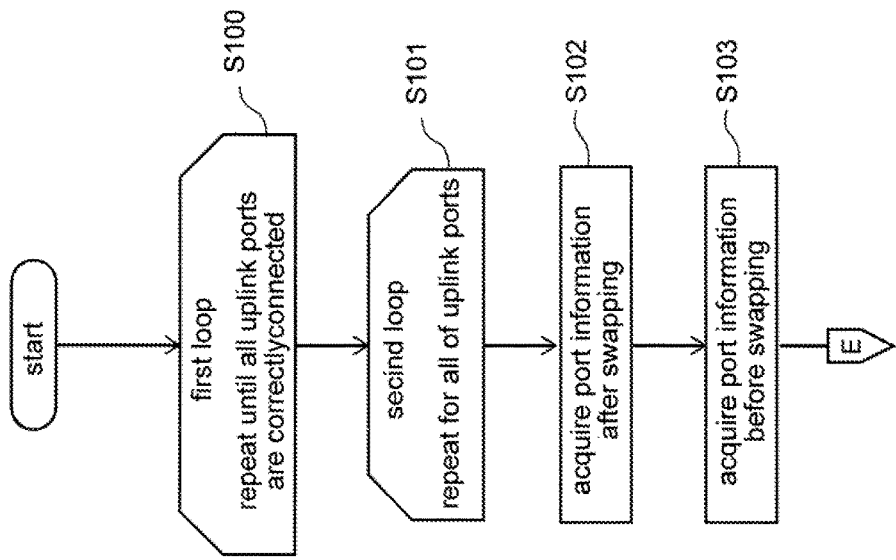
FIGS. 16A to 16C are flowcharts for explaining the determination processing according to the first embodiment.
Figure 16B:
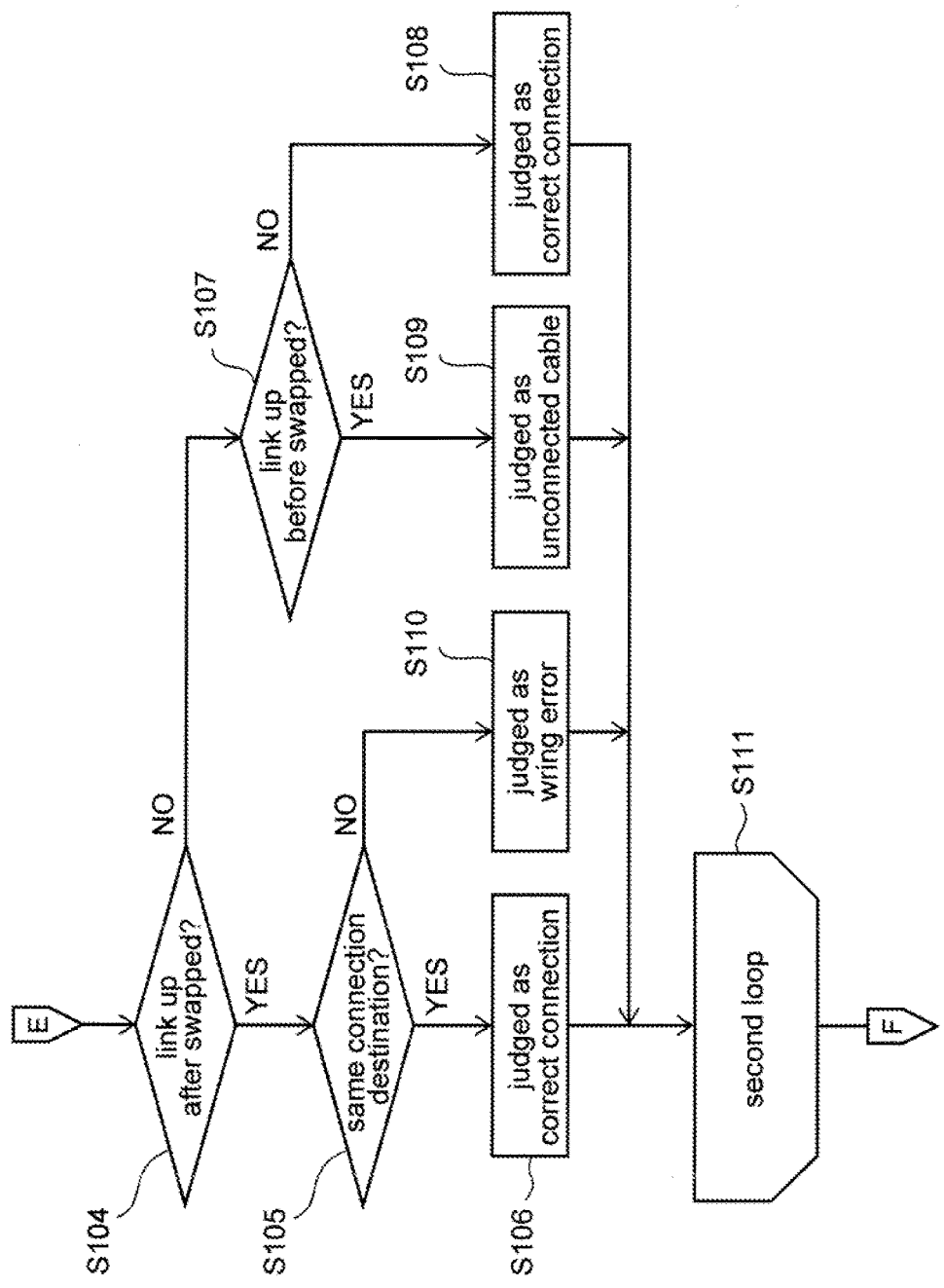
Figure 16C:
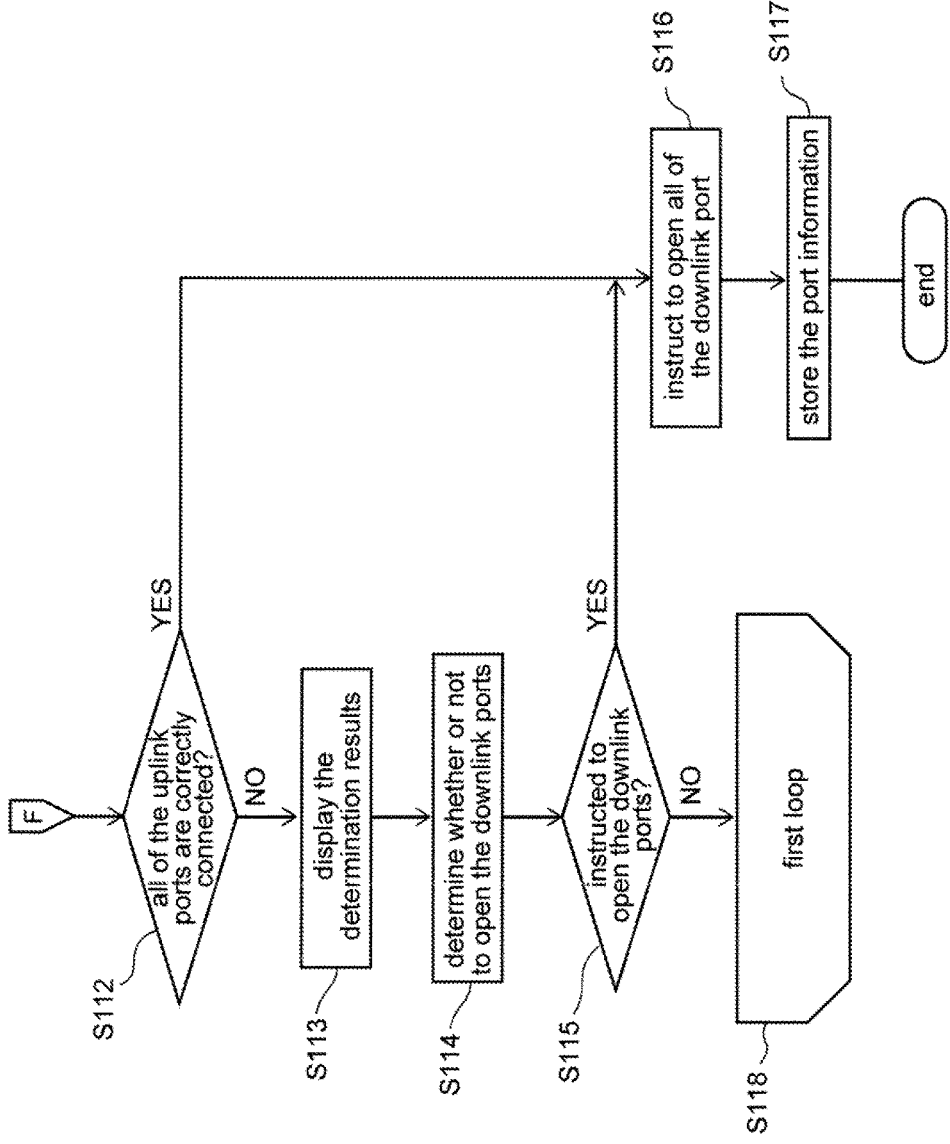

FIGS. 16A to 16C are flowcharts for explaining the determination process of step S32.

As illustrated in FIG. 16A, the determination process includes a first loop (step S100) and a second loop (step S101) therein.

A condition to exit from the first loop is that the correct connection is established for all of the uplink ports 52.

Meanwhile, a condition to exit from the second loop is that each steps described below is executed for all of the uplink ports 52.

First, in step S102, the acquisition module of the switch controlling apparatus 40 requests the port information 59 from the swapped new first switch SW1.

Then, upon receipt of that request, the port information acquisition unit 72 of the first switch SW1 sends its own port information 59 stored in the memory 55 to the acquisition module 46. Thus, the acquisition module 46 acquires the port information 59.

Next, the method proceeds to step S103 and the acquisition module 46 requests the port information 59 on the first switch SW1 before the swapping from the storage unit 60.

Then, upon receipt of the request, the storage unit 60 sends the port information 59 on the first switch SW1 before the swapping, which is previously stored in the storage unit 60 in step S6, to the acquisition module 46. Thus, the acquisition module 46 acquires the port information 59.

Next, the method proceeds to step S104. In step S104, the determination module 47 determines, on the basis of the port information 59 after the swapping, whether or not the link state of the uplink port 52 after the swapping is the link-up state.

When the link state is determined to be the link-up state (YES), the method proceeds to step S105.

In step S105, the determination module 47 determines whether or not the connection destination of the uplink port 52 before the swapping is the same as that after the swapping by comparing the port information 59 before the swapping with that after the swapping.

Here, when the connection destinations are determined to be the same (YES), this case corresponds to the pattern A of FIG. 15.

Therefore, in this case, the method proceeds to step S106 and the determination module 47 judges that the LAN cable 100 is correctly connected to the uplink port 52.

On the other hand, when the link state is determined to be not the link-up state (NO) in the step S104, the process proceeds to step S107.

In step S107, the determination module 47 determines, on the basis of the port information 59 before the swapping, whether or not the link state of the uplink port 52 before the swapping is the link-up state.

Then, when the link state is determined to be not the link-up state (NO), method proceeds to step S108.

Prior to the execution of step S108, the link state of the uplink port 52 is determined in step S104 and in step S107 to be the link-down state both before and after the swapping.

Accordingly, this case corresponds to the pattern B of FIG. 15 described above, and the determination module 47 judges in step S108 that the LAN cable 100 is correctly connected to the uplink port 52.

On the other hand, when the link state is determined to be the link-up state (YES) in step S107, the method proceeds to step S109.

In this case, the link state of the uplink port 52 before the swapping is determined to be the link-down state in step S104. Therefore, this case corresponds to the pattern D of FIG. 15.

Accordingly, in step S109, the determination module 47 judges that the LAN cable 100 is not connected to the uplink port 52.

In the meantime, when the connection destination of the uplink port 52 before the swapping is determined to be not the same as that after the swapping (NO) in step S105, the method proceeds to step S110.

When the connection destinations are not the same in this manner, this case corresponds to the pattern C of FIG. 15. Accordingly, in step S110, the determination module 47 judges that there exists a wiring error in the LAN cable 100.

After completion of the determinations of steps S106 and S108 to S110 as described above, the method proceeds to step S111.

In step S111, the determination module 47 determines whether or not the condition to exit from the second loop is fulfilled. The condition to exit from the second loop is to execute steps S102 to S110 on all of the uplink ports 52.

When this condition is not fulfilled, then the processes starting from S102 are executed on the uplink port 52 that is not yet subjected to the determination processes of steps S106, and S108 to S110

On the other hand, when it is determined in step S111 that the condition to exit from the second loop is fulfilled, the method proceeds to step S112.

In step S112, the determination module 47 determines, on the basis of the above-described determinations results of steps S106, and S108 to S110, whether or not all of the uplink ports 52 are correctly connected.

Here, when all of the uplink ports 52 are determined to be correctly connected (YES), the method proceeds to step S116.

When all of the uplink ports 52 are correctly connected in this manner, the server 30 can connect to the correct destinations among the first to fourth external devices 91 to 94, even when the downlink ports 51 of the first switch SW1 are opened.

Accordingly, in step S116, the instruction module 48 instructs the downlink port control unit 71 of the first switch SW1 to open all of the downlink ports 51.

Then, upon receipt of this instruction, the downlink port control unit 71 opens all of the downlink ports 51.

Thus, the links are established between the downlink ports 51 of the first switch SW1 and the server 30. Hence, the route control unit 39 (see FIG. 12) of the server 30 determines that the first switch SW1 can be used, thereby bringing the data transfer route back from the route B to the route A.

Thereafter, the method proceeds to step S117. In step S117, the acquisition module 46 of the switch controlling apparatus 40 stores the port information 59 after the swapping, which is acquired in step S102, in the storage unit 60.

On the other hand, when not all of the uplink ports 52 are determined to be correctly connected (NO) in step S112, the method proceeds to step S113.

In step S113, the display unit 80 displays the determination results of the steps S106 and S108 to S110 for each of the uplink ports 52.

As illustrated in FIG. 11, the uplink port display section 85 is displayed on the screen 83 of the display unit 80, and the determination result for each of the uplink port 52 is displayed in the uplink port display section 85.

Next, the method proceeds to step S114 and the operator determines whether or not to open the downlink ports 51.

At this stage, there may be the case in which a wiring error exists in the LAN cable 100 connected to the uplink port 52, and the uplink port 52 may be linked up to the external devices 91 to 94 while the above wiring error exists. When the downlink ports 51 are opened in this case, there is a risk that the route control program 38 of the server determines that the route A passing through the switch SW1 can be used, and consequently the server 30 is connected to the wrong external device 91, 92, 93 or 94.

Nevertheless, there may also be the case in which the operator wishes to forcibly open the downlink ports 51 manually during the maintenance work for some reasons. Therefore, in this step, the operator determines whether or not to open the downlinks 51 by operator's own decision.

Next, the method proceeds to step S115 and the determination module 47 determines whether or not the operator instructs to open the downlink ports 51.

When it is determined that the operator instructs to open (YES), the method proceeds to the aforementioned step S116 to open all of the downlink ports 51.

On the other hand, when it is determined that the operator does not instruct to open (NO), the method proceeds to step S118.

In step S118, the determination module 47 determines whether or not the condition to exit from the first loop is fulfilled. The condition to exit from the first loop is that the correct connections are established for all of the uplink ports 52.

When this condition is not fulfilled, the above-described steps S100 to S117 are repeated.

When these steps are repeated in this manner, the contents of the port information 59 acquired in step S102 change every time step S102 is performed.

FIG. 17 is a diagram schematically illustrating an example of changes in the contents of the port information 59.

As illustrated in FIG. 17, at the stage of acquiring in the first time around, all of the uplink ports 52 are not connected to the LAN cables 100. Accordingly, all of the uplink ports 52 of ports #9 to #12 are in the link-down state. Moreover, all of the connection destinations of the ports #9 to #12 are not successfully acquired.

At the stage of acquiring in the second time around, the LAN cables 100 are connected to the uplink ports 52 of the ports #9 and #10, so that the connection destinations of these ports are successfully acquired. However, the port #10 is in the link-down state.

Then, at the stage of acquiring in the third time around, the LAN cables 100 are connected to all of the uplink ports 52. Therefore, all of the uplink ports 52 of the ports #9 to #12 are in the link-up state, and the connection destinations of all of the ports #9 to #12 are successfully acquired.

In this way, the basic steps of the determination process in step S32 (see FIG. 14D) are completed.

Reference is made again to FIG. 14D.

After the step S32 is performed as described above, the method proceeds to step S33.

In step S33, the determination module 47 determines that the swapping work of switch is completed, and notifies the display unit 80 that the swapping work is completed.

Subsequently, the method proceeds to step S34 and the display unit 80 displays information on the completion of the swapping work.

Thereafter, the acquisition module 46 of the switch controlling apparatus 40 acquires the port information 59 on the swapped new first switch SW1 at a predetermined timing.

Figure 14E:
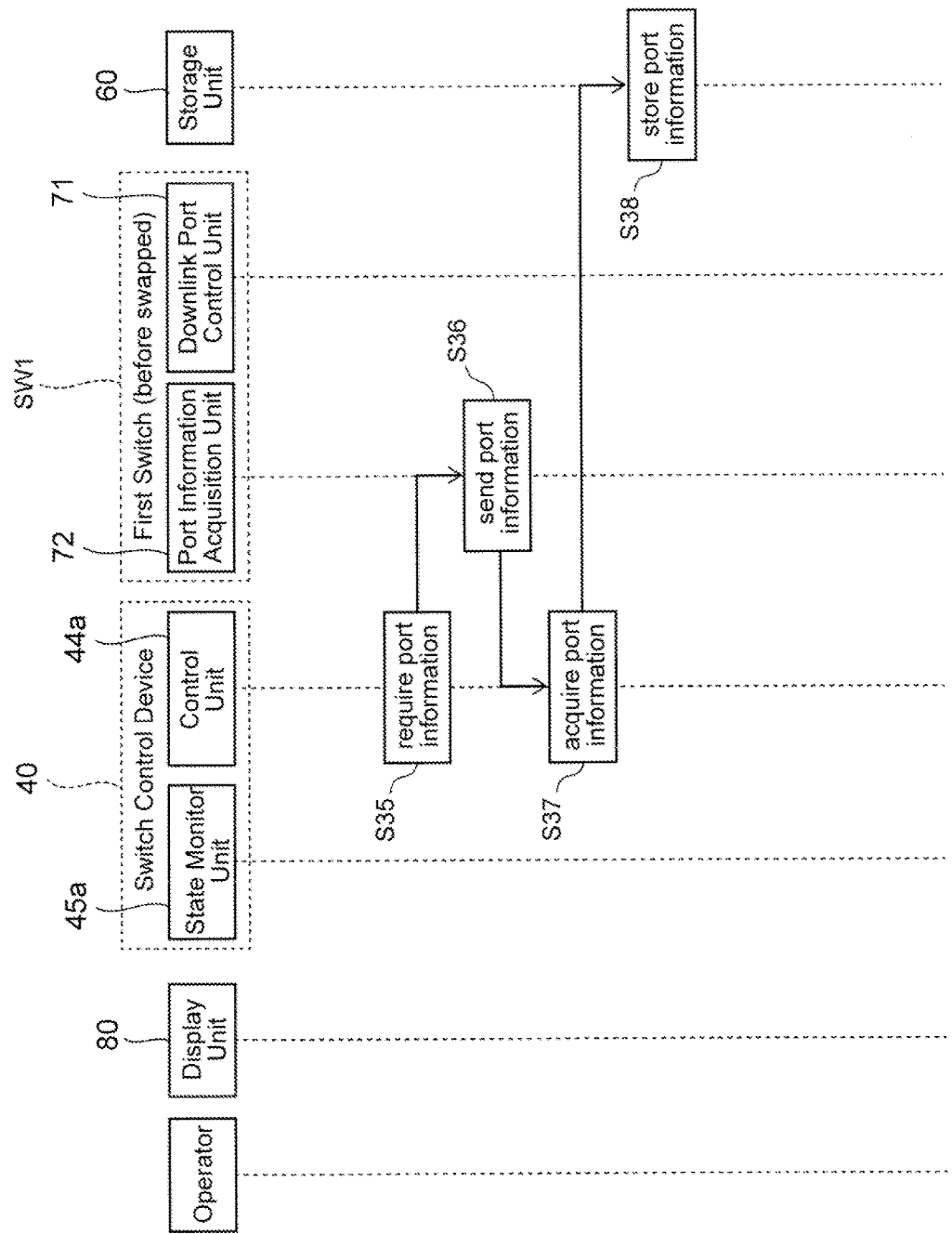

In order to acquire the port information 59, the acquisition module 46 firstly requests the port information 59 from the port information acquisition unit 72 of the first switch SW1 in step S35 (see FIG. 14E).

Then, the method proceeds to step S36 and the port information acquisition unit 72, which receives the above request, sends the port information 59 to the acquisition module 46.

In this way, the acquisition module 46 acquires the port information 59 in step S37.

Thereafter, the method proceeds to step S38 and the acquisition module 46 stores the port information 59 in the storage unit 60.

By these steps, the basic steps of the method of controlling a switch of the present embodiment are completed.

According to the above-described present embodiment, the determination is made in step S105 whether or not the connection destinations of the uplink port 52 before and after the swapping are the same by comparing the port information 59 before and after the swapping of the first switch SW1.

Thus, it is possible to determine that there is no wiring error between the LAN cable 100 and the first switch SW1 when the connection destinations before and after the swapping are the same. Also, it is possible to determine that there is a wiring error between the LAN cable 100 and the first switch SW1 when the connection destinations before and after the swapping are different.

As a result, it is possible to prevent the operator from operating the system in the state where the wiring error exists therein, and to prevent the system from being shut down due to the wiring error.

Moreover, since all of the downlink ports 51 are closed in advance in step S16, link is not established between the server 30 and the downlink ports 51 in the state where there exists the wiring error in the LAN cable 100.

Accordingly, it is possible to prevent the route control program 38 of the server 30 from using the route A (see FIG. 12), which passes through the first switch SW1, despite the existence of the wiring error. Therefore, it is possible to prevent the server 30 from connecting to the wrong external devices 91 to 94 due to the wiring error.

Furthermore, it is not necessary to waste time to bring the data transfer route back to the route B (see FIG. 12) again in order to fix the wiring error. Thus, availability of the system can be increased.

Second Embodiment

In the first embodiment, all of the downlink ports 51 are opened in step S116 of FIG. 16C after the correct connections are established for all of the uplink ports 52.

On the other hand, in the present embodiment, the usable downlink ports 51 are individually opened.

FIG. 18 is a functional configuration diagram of the first switch SW1 of the present embodiment.

Note that the same elements in FIG. 18 as those described in the first embodiment are denoted by the same reference numerals as those in the first embodiment, and description thereof is omitted below.

As illustrated in FIG. 18, in the present embodiment, the plurality of downlink ports 51 and the plurality of uplink ports 52 of the first switch SW1 are divided into a plurality of VLANs (virtual local area networks).

In this example, a port #1 and a port #2 of the downlink ports 51 and a port #9 of the uplink ports 52 are assigned to a VLAN 1. Meanwhile, a port #3 of the downlink ports 51 and a port #10 of the uplink ports 52 are assigned to a VLAN 2. Then, the rest of the ports are assigned to a VLAN 3.

Figure 19:
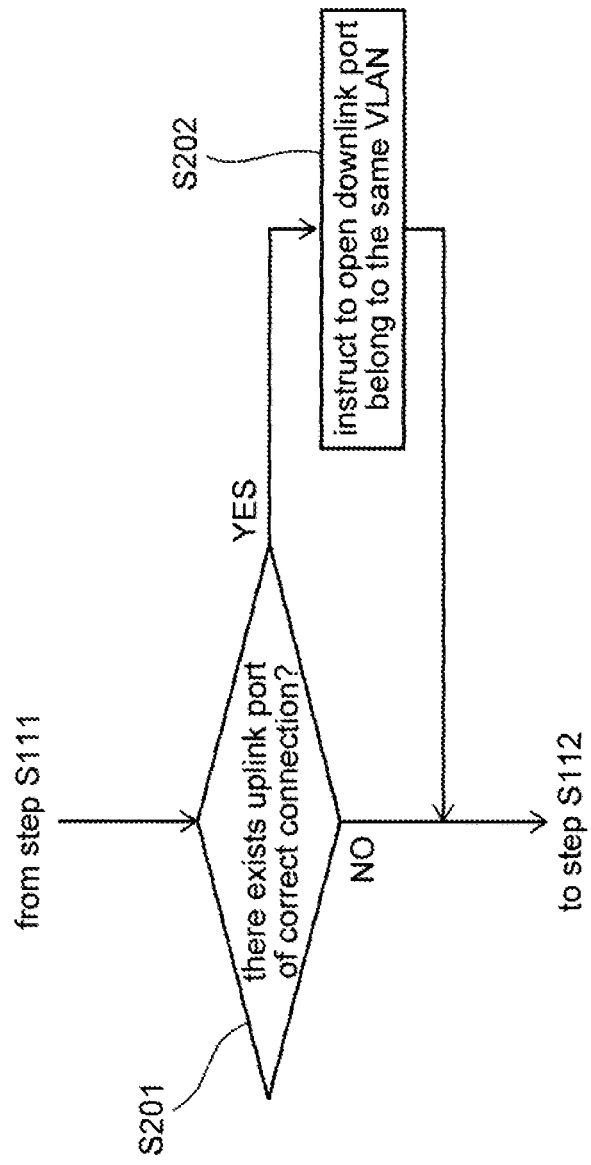
FIG. 19 is a flowchart illustrating a method of controlling a switch according to the second embodiment.

FIG. 19 is a flowchart illustrating a method of controlling a switch of the present embodiment.

In the present embodiment, step S201 is performed after step S111 (see FIG. 16B) of the first embodiment is performed.

In step S201, the determination module 47 determines whether or not there exists the uplink port 52 that is correctly connected, on the basis of the determination results of the steps S106, and S108 to S110 of the first embodiment.

Here, when it is determined that there exists the uplink port 52 that is correctly connected (YES), the method proceeds to step S202.

In step S202, the instruction module 48 instructs the downlink port control unit 71 (see FIG. 7) of the first switch SW1 to open the downlink ports 51 belonging to the same VLAN to which the correctly connected uplink port 52 belongs.

Then, upon receipt of this instruction, the downlink port control unit 71 open the downlink port 51 belonging to the above VLAN.

For instance, in the example of FIG. 18, assume that the port #9 of the uplink ports 52 is correctly connected. In this case, the port #1 and the port #2 belonging to the same VLAN as the port #9 are opened.

Meanwhile, when a plurality of the ports (a port #11 and a port #12) of the uplink ports 52 are belonging to the same VLAN as in the VLAN 3 of FIG. 18, the corresponding downlink ports 51 are opened after all of these uplink ports 52 belonging to the same VLAN are correctly connected. In this example, ports #4 to #8 are opened when both the port #11 and the port #12 are correctly connected.

After step S202 is performed in this manner, step S112 (see FIG. 16C) described in the first embodiment is performed.

Likewise, step S112 is also performed when it is determined in step S201 that there exists no uplink port 52 that is correctly connected (NO).

Thus, the basic steps of the method of controlling a switch of the present embodiment are completed.

According to the above-described present embodiment, the downlink port 51 belonging to the same VLAN as the correctly connected uplink port 52 is opened in step S202.

Thus, it is possible to use the downlink ports 51 individually without waiting for the establishment of the correct connection of all of the uplink ports 52, and thus to reduce useless waiting time.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable recording medium having stored therein a switch controlling program causing a computer to execute a process, the computer being connected to a switch and a storage unit via a network, the process comprising:

storing, in the storage unit, port information of the switch when the switch normally operates, the switch including first ports and second ports, wherein data is transferred between the first ports and the second ports, the port information including connection destinations of the second ports of the switch;

when the switch is swapped for a second switch due to a breakdown of the switch, instructing the second switch to close each of first ports of the second switch, in response to a detection of connection of the second switch with the computer after the switch is swapped for the second switch;

acquiring from the storage unit port information for each of second ports of the second switch after the swapping;

acquiring from the storage unit the port information for each of the second ports of the switch before the swapping;

determining whether there exists a second port whose connection destination is unchanged before and after the swapping, by comparing the port information for each of the second ports of the second switch after the swapping with the port information for a corresponding one of the second ports of the switch before the swapping; and instructing the second switch to open at least one of the first ports of the second switch, which is associated with data transferred from or to the second port whose connection destination is unchanged before and after the swapping, in response to a determination that there exists the second port whose connection destination is unchanged before and after the swapping.

2. The non-transitory computer readable recording medium according to claim 1, wherein the first ports and the second ports of the second switch are divided into a plurality of virtual local area networks, and the instructing the second switch to open the at least one of the first ports of the second switch includes instructing the second switch to open a first port of the second switch belonging to the same virtual local area network as the second port of the second switch whose connection destination is unchanged from the connection destination of the second port of the switch before the swapping.

3. The non-transitory computer readable recording medium according to claim 1, wherein the instructing the second switch to open the at least one of the first ports of the second switch includes instructing the second switch to open all of the first ports when the connection destination after the swapping is unchanged from the connection destination before the swapping for all of the second ports.

4. The non-transitory computer readable recording medium according to claim 1, the process further comprising:

instructing the second switch to open all of the first ports of the second switch in response to receiving an instruction from an operator after each of the first ports of the second switch is instructed to be closed in response to the detection of connection of the second switch with the computer.

5. The non-transitory computer readable recording medium according to claim 1, the process further comprising:

acquiring from the storage unit a model information of the switch before the swapping;

acquiring from the storage unit the model information of the second switch for which the switch is swapped; and instructing the second switch to open all the first ports of the second switch while skipping the determining, when the model information of the switch before the swapping is different from the model information of the second switch.

6. The non-transitory computer readable recording medium according to claim 1, wherein the port information includes a link state indicating whether each of the second ports and a corresponding one of the connection destinations are in a link-down state or in a link-up state, and the instructing the second switch to open the at least one of the first ports of the second switch includes instructing the second switch to open the at least one of the first ports of the second switch when both the link state of the second port before the swapping and the link state of the second port after the swapping are in the link-down state.

7. The non-transitory computer readable recording medium according to claim 1, the process further comprising:

judging whether or not the second port is correctly connected to the connection destination with a cable, on the basis of a result of the determining.

8. The non-transitory computer readable recording medium according to claim 7, the process further comprising:

displaying whether or not the second port is correctly connected to the connection destination with the cable.

9. A switch controlling apparatus comprising:

a processor; and a memory coupled to the processor, wherein the switch controlling apparatus is connected to a switch and a storage unit via a network and the processor executes a process including:

storing, in the storage unit, port information of the switch when the switch normally operates, the switch including first ports and second ports, wherein data is transferred between the first ports and the second ports, the port information including connection destinations of the second ports of the switch;

when the switch is swapped for a second switch due to a breakdown of the switch, instructing the second switch to close each of first ports of the second switch, in response to a detection of connection of the second switch with the computer after the switch is swapped for the second switch;

acquiring from the storage unit port information for each of second ports of the second switch after the swapping;

acquiring from the storage unit the port information for each of the second ports of the switch before the swapping;

determining whether there exists a second port whose connection destination is unchanged before and after the swapping, by comparing the port information for each of the second ports of the second switch after the swapping with the port information for a corresponding one of the second ports of the switch before the swapping; and instructing the second switch to open at least one of the first ports of the second switch, which is associated with data transferred from or to the second port whose connection destination is unchanged before and after the swapping, in response to a determination that there exists the second port whose connection destination is unchanged before and after the swapping.

10. A method of controlling a switch executed by a switch controlling apparatus, the switch controlling apparatus being connected to the switch and a storage unit via a network, the method comprising:

storing, in the storage unit, port information of the switch when the switch normally operates, the switch including first ports and second ports, wherein data is transferred between the first ports and the second ports, the port information including connection destinations of the second ports of the switch;

when the switch is swapped for a second switch due to a breakdown of the switch, instructing the second switch to close each of first ports of the second switch, in response to a detection of connection of the second switch with the switch controlling apparatus after the switch is swapped for the second switch;

acquiring from the storage unit port information for each of second ports of the second switch after the swapping;

acquiring from the storage unit the port information for each of the second ports of the switch before the swapping;

determining whether there exists a second port whose connection destination is unchanged before and after the swapping, by comparing the port information for each of the second ports of the second switch after the swapping with the port information for a corresponding one of the second ports of the switch before the swapping; and instructing the second switch to open at least one of the first ports of the second switch, first port and which is associated with data transferred from or to the second port whose connection destination is unchanged before and after the swapping, in response to a determination that there exists the second port whose connection destination is unchanged before and after the swapping.

\* \* \* \* \*